(12) United States Patent
Kling

(10) Patent No.: US 8,072,453 B2
(45) Date of Patent: Dec. 6, 2011

(54) PATTERNING TECHNOLOGY FOR FOLDED SHEET STRUCTURES

(76) Inventor: Daniel H. Kling, Ringoes, NJ (US)

( * ) Notice: Subject to any disclaimer, the term of this patent is extended or adjusted under 35 U.S.C. 154(b) by 11 days.

(21) Appl. No.: 12/210,112

(22) Filed: Sep. 12, 2008

(65) Prior Publication Data

US 2009/0029838 A1    Jan. 29, 2009

Related U.S. Application Data

(63) Continuation of application No. 11/174,800, filed on Jul. 5, 2005, now abandoned, which is a continuation of application No. 09/952,057, filed on Sep. 14, 2001, now Pat. No. 6,935,997.

(60) Provisional application No. 60/232,416, filed on Sep. 14, 2000.

(51) Int. Cl.
*G06T 15/30* (2011.01)
*G06F 19/00* (2011.01)

(52) U.S. Cl. ......... 345/423; 700/133; 493/356; 156/443

(58) Field of Classification Search .......... 700/131–134, 700/98; 72/335, 379.2; 345/423; 702/150, 702/155; 493/435, 356; 156/443
See application file for complete search history.

(56) References Cited

U.S. PATENT DOCUMENTS

| | | | |
|---|---|---|---|
| 3,698,879 A | 10/1972 | Lucien | |
| 3,992,152 A | 11/1976 | Okinaka et al. | |
| 4,472,473 A | 9/1984 | Davis et al. | |
| 4,518,544 A | 5/1985 | Carter et al. | |
| 5,008,140 A | 4/1991 | Schmertz | |
| 5,028,474 A | 7/1991 | Czaplicki | |
| 5,049,123 A | 9/1991 | Breton et al. | |
| 5,090,672 A | 2/1992 | Ballestrazzi et al. | |
| 5,134,013 A | 7/1992 | Parker | |

(Continued)

FOREIGN PATENT DOCUMENTS

WO    98/06517 A1    2/1998

OTHER PUBLICATIONS

Office Action issued on May 12, 2008 for U.S. Appl. No. 11/174,800.

(Continued)

*Primary Examiner* — Kakali Chaki
*Assistant Examiner* — Sheela Rao
(74) *Attorney, Agent, or Firm* — Anton P. Ness; Fox Rothschild LLP

(57) ABSTRACT

The present invention supplies practical procedures, functions or techniques for folding tessellations. Several tessellation crease pattern techniques, and the three-dimensional folded configuration are given. Additionally several new forming processes, including mathematical methods for describing the material flow are disclosed doubly-periodic folding of materials that name the doubly-periodic folded (DPF) surface, including vertices, edges, and facets, at any stage of the folding. This information is necessary for designing tooling and forming equipment, for analyzing strength and deflections of the DPFs under a variety of conditions, for modeling the physical properties of DPF laminations and composite structures, for understanding the acoustic or other wave absorption/diffusion/reflection characteristics, and for analyzing and optimizing the structure of DPFs in any other physical situation. Fundamental methods and procedures for designing and generating DPF materials include ways for defining the tessellation crease patterns, the folding process, and the three-dimensional folded configuration. The ways are mathematically sound in that they can be extended to a theorem/proof format.

20 Claims, 32 Drawing Sheets

U.S. PATENT DOCUMENTS

| | | | |
|---|---|---|---|
| 5,179,770 A | 1/1993 | Block et al. | |
| 5,234,727 A | 8/1993 | Hoberman | |
| 5,344,379 A | 9/1994 | Garrone | |
| 5,393,579 A | 2/1995 | Witte | |
| 5,484,378 A | 1/1996 | Braithwaite | |
| 5,694,803 A | 12/1997 | Ervin et al. | |
| 5,712,020 A | 1/1998 | Parker | |
| 5,723,201 A | 3/1998 | Czetto, Jr. | |
| 5,894,044 A | 4/1999 | Norcom et al. | |
| 5,899,842 A | 5/1999 | Di Pilla | |
| 5,937,519 A | 8/1999 | Strand | |
| 5,966,974 A * | 10/1999 | Song | 72/18.2 |
| 5,980,444 A | 11/1999 | Dickhoff | |
| 6,005,216 A | 12/1999 | Rethwish et al. | |
| 6,185,476 B1 | 2/2001 | Sakai | |
| 6,256,595 B1 | 7/2001 | Schwalb et al. | |
| 6,319,586 B1 * | 11/2001 | Colson | 428/116 |
| 6,640,605 B2 | 11/2003 | Gitlin et al. | |
| 6,935,997 B2 | 8/2005 | Kling | |

OTHER PUBLICATIONS

Office Action issued on Nov. 29, 2004 for U.S. Appl. No. 09/952,057.

* cited by examiner

| Method | Two Cross Section Method | Wave-Tessellation Method | Wave-Fold Method | Strip-Map Method | Composition of Local Isometries Method |
|---|---|---|---|---|---|
| Data | | | | | |
| Row of Edges in Tessellation (RET) | | O | O | | |
| Row Cross-Section (RCS) | O | | | O | |
| Row of Edges on Folded DPF (RED) | | | O | | |
| Augmented Col. of Edges in Tess. (CET) | | O | | | |
| Column Cross-Section (CCS) | O | | O | | |
| Column Strip Map (CSM) | | | | O | |
| Local Isometry Functions | | | | | O |
| Advantages | | | | | |
| Easiest to use. | O | | O | O | |
| Direct access to 3d shape | O | | | O | |
| Emphasizes Facet Shape | | O O | O | O | |
| Remains Constant w/ Folding Process | | O | | | |
| Guarentees no embedding problems | | | | O | |
| Explains Zero-Curvature of Surface | | | | O | O |
| Additional Generalizations for Method | | O | O | O | O O |

FIGURE 3

(a) $\rho \circ (\gamma \times I)(\mathbb{R}^2)$  (b) $(I \times I \times |\,|) \circ \rho \circ (\gamma \times I)(\mathbb{R}^2)$  (c) $(I \times I \times \Xi) \circ \rho \circ (\gamma \times I)(\mathbb{R}^2)$ For Two Cross-Section Algorithm, Use z-values of RCS to offset CCS
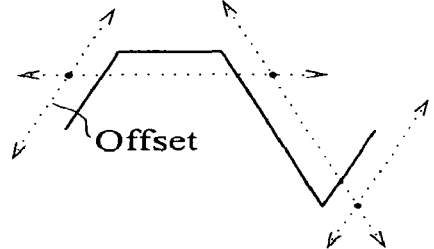
For Wave-Fold Algorithm, Adjust amplitude of RED Normal to bisectors of CCS
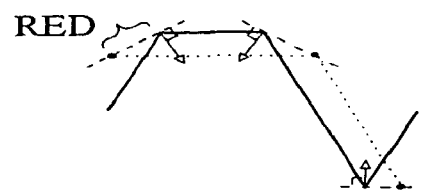
The folds in the Strip Map produce Similar reflections in the YZ plane
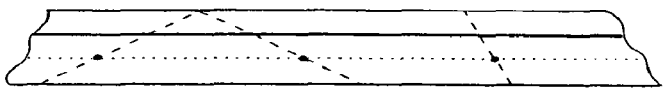
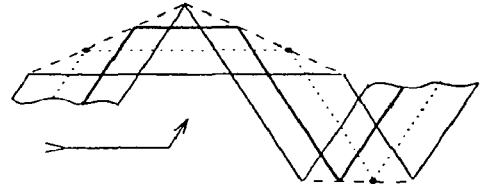
FIGURE 16 a) Simple parallel mirrors b) Repetitive series of mirrors a) Reflecting a Plane between Mirrors    b) Reflecting a Corrugated Surface between Mirrors

Traditional Creasing Process
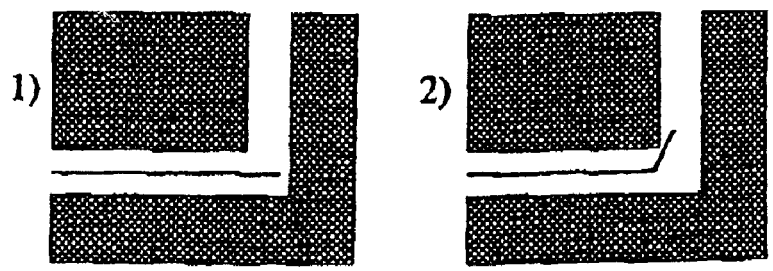
Novel Creasing Process
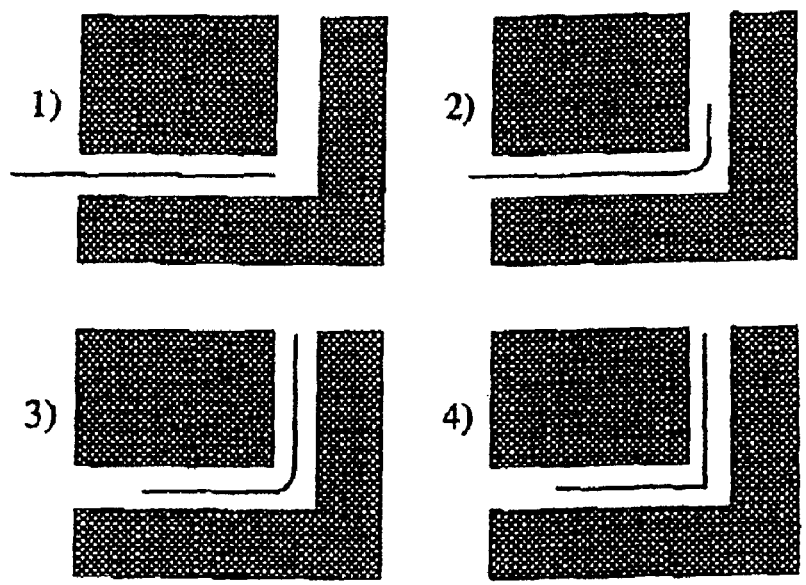
FIGURE 23

|  | n even | n odd |
|---|---|---|
| m even | (na,mB,0) | (na,b+mB,0) |
| m odd | (na,mB,C) | (na,b+mB,C) |

FIGURE 27

PATTERNING TECHNOLOGY FOR FOLDED SHEET STRUCTURES

CROSS-REFERENCE TO RELATED APPLICATIONS

This application is a continuation of U.S. application Ser. No. 11/174,800 filed on Jul. 5, 2005 now abandoned, which is a continuation of U.S. application Ser. No. 09/952,057, filed on Sep. 14, 2001 and now U.S. Pat. No. 6,935,997, which claims the benefit of U.S. Provisional Application 60/232,416 filed on Sep. 14, 2000. The teachings of all of these applications are incorporated herein by reference to the extent they are not inconsistent with the instant disclosure.

FIELD OF THE INVENTION

The present invention relates to folded tessellations and other folded structures. More particularly, the present invention relates to specific configurations, and patterning methods, applicable to the unfolded sheet, the three-dimensional folded structure, processes of transforming a sheet to a folded structure, and machine descriptions for the same.

BACKGROUND OF THE INVENTION

A well-known problem in the art of designing and forming materials into folded networks is that with the exception of deformation at the fold, the material is not significantly stretched, and this imposes simultaneous constraints on the vertices, edges, and facets of a proposed structure and on the process of forming such a structure. However folded structures have many advantages over structures produced by other means such as casting, stamping or assembling, such as cost of manufacture and the versatility to many sheet materials.

SUMMARY OF THE INVENTION

Accordingly, the present invention discloses our methods and procedures for designing and generating folding networks and tessellations. Several means for defining the crease patterns, and the three-dimensional folded configuration are given. Additionally several new forming processes, including mathematical methods for describing the material flow are disclosed. The description and use of practical methods, data structures, functions and techniques that name the folded surface, including vertices, edges, and facets, and that describe the forming processes for sheet material is disclosed. This information is valuable for designing tooling and forming equipment, for analyzing strength and deflections of the DPFs under a variety of conditions, for modeling the physical properties of DPF laminations and composite structures, for understanding the acoustic or other wave absorption/diffusion/reflection characteristics, and for analyzing and optimizing the structure of DPFs in any other physical situation. Many other aspects of our folding technology are also presented.

BRIEF DESCRIPTION OF THE DRAWINGS

FIG. 3 is a chart comparing various folding methods according to the present invention.

FIG. 16 illustrates the geometrical comparison of DPF-Vertex Calculations.

FIG. 23 shows a comparison of the conventional creasing process versus the novel creasing process according to the present invention.

FIG. 27 provides a table illustrating coordinates for the vertex of a chevron pattern using the wave-fold method and parameterized RED and CCS according to the present invention.

DETAILED DESCRIPTION

Introduction and Definitions

Figure 1:
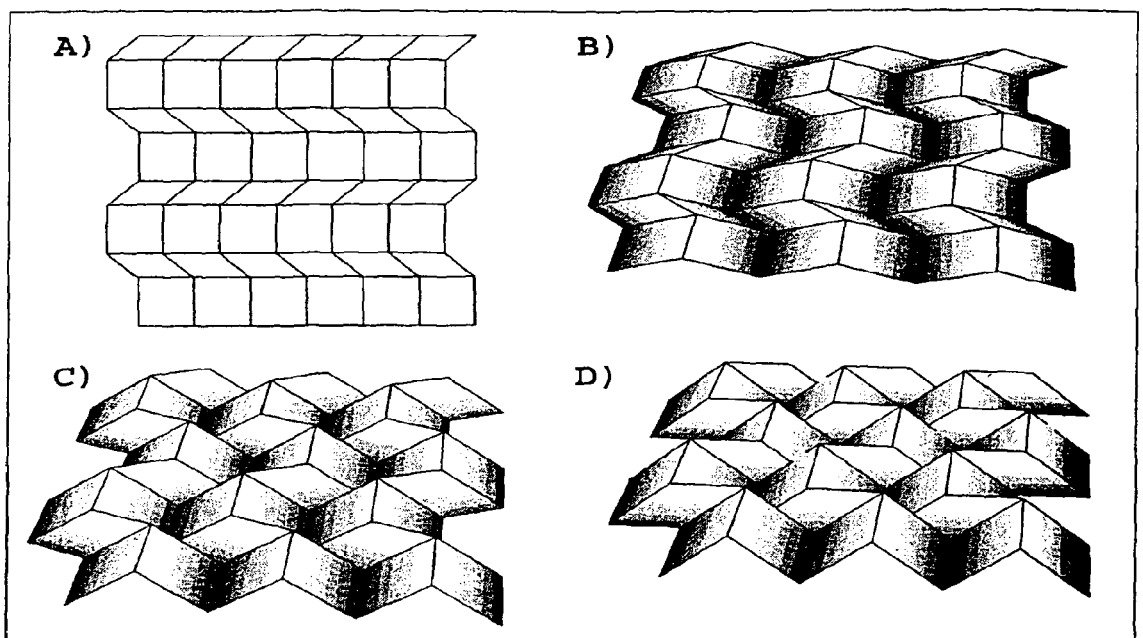
FIG. 1 illustrates the creasing along a tessellation to produce a DPF.

It should be understood by persons of ordinary skill in the art that the methods and procedures described here in Part I refer to folding an idealized infinitely thin plane. The plane is deformed, without changing any intrinsic lengths along the surface itself, to produce multi-faceted geometric structures.

Any surface folded from a plane will have zero-curvature. This means the Jacobian of the Gauss map is zero on smooth regions, that the sum of the geodesic curvatures along an edge singularity (crease), when measured from the two sides of the edge, will total zero, and that at each vertex the cone angle will total $2\pi=360$ degrees. The zero-curvature results from the fact that the material is not stretched by folding, and so the surface remains isometric to the plane.

In practice, a sheet has finite thickness and may have intentional or unintentional distortions in superposition to the ideal process described here. The idealized zero-curvature surface is the architectural base, from which close to zero-curvature surfaces will be designed. For instance, even if a folding pattern for sheet material is designed identically to the folding pattern for a plane, the physical surface will not have zero-curvature perfectly, because the thickness of the sheet causes a bend radius at each fold, and generally this forces very small regions of positive curvature and negative curvature near the vertices. Moreover, it may be desirable to select an idealized folding pattern to plan the major displacement of the sheet material, and then to exploit the plasticity of the material to make minor adjustments to the surface configuration. The design difficulties and manufacturing advantages for these close to zero-curvature surfaces are very much the same as for zero-curvature surfaces, and so this is a valuable application of our technology. Typically, close to zero-curvature surfaces and zero-curvature surfaces differ by a minor perturbation. Thus, by using the idealized zero-curvature surface as an architectural base, these valuable close to zero-curvature surfaces are both theoretically and in practice an application of our technology. However, the key step is determining the idealized architectural base, and this is the focus of our numerical and geometrical methods.

The technology disclosed here also applies to repetitive folding patterns. These idealized surfaces may have one or two directions of repetition. The repetitions may correspond to translation or rotational symmetry. A doubly-periodic surface with zero curvature is called a folded tessellation. In practice, folded tessellations are finite and may have intentional or unintentional imperfections and so may have no exact translational or rotational symmetries.

In this disclosure the term DPF refers to the patterned surfaces generated by our methods and technology presented here. The idealized DPF will have exactly zero curvature. Moreover, by entering non-periodic data into the procedures and methodology, many valuable non-periodic folding patterns can be designed by DPF technology. By entering periodic data into our methodologies, the resulting surfaces will be folded tessellations. A physical folded sheet is called a DPF if its design has an architectural base from an idealized DPF, although the scope of DPF technology is much broader, including sheet material with regions or components that are designed in part by DPF procedures and methodology, with or without intentional or unintentional variations into close to zero curvature geometry.

(In reference to other documents, the meaning of the acronym DPF has gone through a series of changes, and at one time referred abstractly to doubly-periodic flat surfaces that may or may not have existed in only three-dimensions.)

Each of our various designing methods has its own generalizations for defining DPFs. The main class of DPFs are the doubly-periodic folding structures describable by all of our designing methods. The simplest class of DPFs is included in the main class and has a more obvious array structure and also the straightforward two translation symmetries, and will be described first. Until otherwise stated, the discussion in part I will refer to DPFs in the simplest class. The terms and techniques given are part of the invention, and generally will not apply to folding structures produced outside our technology.

FIG. 1 shows four stages in the Uniform DPF Process for producing a typical DPF in the simplest class. In the Uniform DPF Process, the individual facets are assumed to be rigid and only the fold angles of the edges may change. In our Uniform process the DPF flexes with one parameter of motion. Data from any one stage will determine the entire process. In FIG. 1A-D this parameter, called the flex parameter, varies from zero to its maximum $\pi/2=90$ Degrees.

Figure 2:
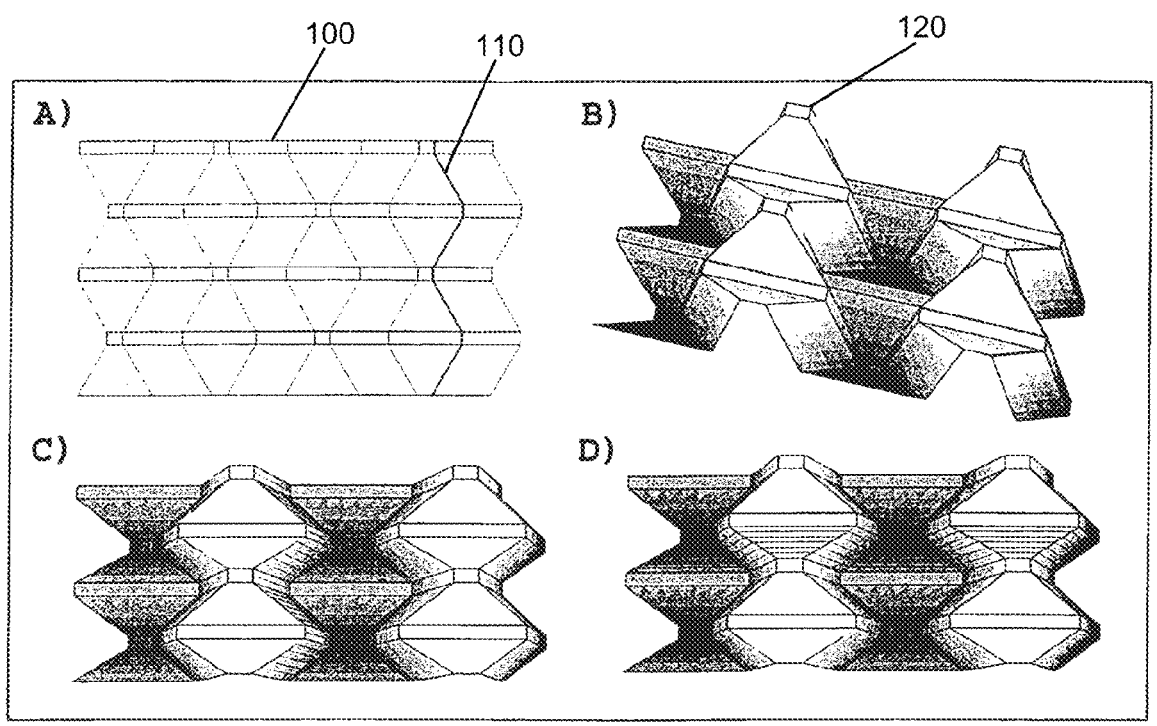
FIG. 2 illustrates the column and row phenomenon.

Notice the edges form a net (also called a mesh or a graph) on the surface, with degree four vertices and quadrilateral regions. By analogy with the usual rectangular grid, this enables the edges to be divided into two types, according to whether they advance in the row or column direction. In one direction (for the simplest class) the edges form parallel lines in the fold crease tessellation, as shown in FIG. 1A. The end-to-end chains in this direction are considered to be the columns of edges (left to right in FIGS. 1 and 2). The other edges form end-to-end chains that are considered to be the rows of edges (top to bottom in the figures). In FIG. 2A, an exemplary row and column are shown in boldface lines.

It can be seen that at any stage of the folding process, the edges in any given row all have the same fold convexity and are coplanar, and that the edges in any given column alternate sequentially in fold convexity and are coplanar in a vertically oriented plane.

Two other observations will be necessary concerning cross sections in the column and row directions of a folded DPF. Of course, the facets connect in the row and column direction to form chains called a row and column of facets. A row of facets will be bounded on either side by a row of edges, and will have its facets connected successively across individual column edges. At any stage of folding all of the column edges within a row of facets are parallel. Furthermore, an entire row of facets can be developed into a family of line segments parallel to its column edges, as shown in FIG. 2C. Viewing a row of facets as a family of parallel line segments, and extending the line segments if necessary to a larger ruled surface, one chooses a plane normal to the parallel lines of the ruled surface and defines the row cross-section to be the intersection of the plane with the ruled surface. Each row of facets will be seen to have the same row cross section—although if one uses the orientations available the row cross section alternates in mirror image with each subsequent row of facets.

In the fold crease tessellation of an unfolded DPF, the two columns of edges that bound a column of facets on both sides form parallel lines. During the Uniform DPF Process, the vertical planes that contain the columns of edges are all parallel. Moreover note any other line drawn on the tessellation parallel to the column edges will also lie in a vertical plane throughout the process. The plane will be in fact parallel to the planes containing the columns of edges. This folded drawn line is called a column cross-section. Several column cross-sections are drawn on one column of edges in the DPF in FIG. 2D.

It is sufficient (for the simplest class still) to specify the equivalent of one row and one column and their intersection point to determine the entire DPF surface. Our procedures and methods differ in how the row and column data is implied mathematically.

As shown in FIG. 3, for the row data, three presentations are currently available:
 1. A row of edges in the tessellation (RET).
 2. The row cross-section (RCS).
 3. A row of edges on the folded DPF (RED).

As these are piecewise-linear coplanar curves, it suffices to enter the vertices on a plane for one unit of repetition with the number of repetitions desired. This is the preferred data entry in our computer programs, although other methods, such as describing the edges as incremental vectors in polar coordinates, have also been used.

In addition, as shown in FIG. 3, for the column data, three presentations are currently available:

1. A column of edges in the tessellation, augmented to give the relative amplitudes and spacing of successive rows of the tessellation (CET).
2. The column cross-section (CCS).
3. A column strip map (CSM).

For the first two it again suffices to enter the two-dimensional vertices for one unit of repetition and the number of repetitions desired. A similar reduction is possible for the strip map and is discussed, infra, with the Strip-Map Method in with regard to strip map design and shown in FIGS. 9-13.

FIG. 3 summarizes our procedures and methods by their row/column data requirements, and gives an overview of their respective advantages.

As coordinates become necessary x, y and z will denote the row, column, and vertical directions respectively. The row data RCS and RED will be supplied on an XZ plane, RET on an XY plane, and the column data supplied on an YZ plane. The RCS and RED Z coordinates are rotated relative to the three dimensional z coordinate.

With the exception of tessellation data, the row and column data are usually assumed to refer to the DPF in its intended position. For the Wave-Tessellation Method, the flex parameter must be given additionally in some form. Each method also has the option for changing the intended flex parameter if desired, and can implement the change within the Method by adjusting the data entered to fit the new stage of folding as described, infra.

For the main class of DPFs it is also possible to translate between methods, as described in Section 9. Thus the designer may visualize the DPF from several perspectives and create a DPF to meet variously stated requirements. Moreover, while editing, rescaling, and partially folding or unfolding, the user may jump back and forth between methods. This flexibility enables the data to be developed in the terms of the methods most convenient for the application, so one can find and optimize the choice of DPF readily.

The methods share some common features relating to the format of the data entered and the data out-putted. To generate folded tessellations, first for efficiency one may enter just one unit of the row and column data along with their respective repetition numbers. One may apply the repetitions to the entry data to generate the full row and column information and then apply the procedures to calculate the DPF surface, or one may input into the procedure one row unit and one column unit, apply the procedure, and then apply the repetitions in the row and column direction to generated the full surface. In some cases, such as when the row and column data do not have a standard repetition, one chooses to use the full row and column data for the entry data.

Also the piecewise linear (PL) structure of the entry data and the out-putted DPF surface means that they may be linearly interpolated from their vertices, and the interpolation can occur before or after the application of the procedures. For instance with the Two Cross-Section Method, for each pair of segments, with one from RCS and one from CCS, the method will generate a quadrilateral facet on the DPF. The method takes the two endpoints of the two segments to the four vertices of the quadrilateral. However, the convex-hull of the four output vertices defines the quadrilateral. Thus it may be computationally more efficient to use just the vertices of the PL curves to generate the vertices of the facets of the DPF and then interpolate to construct the facet regions, then to use the fully connected PL curves to generate the facet regions. The methodology to exploit this fully for these folding maps is described in Section 7.

Each of the computer codes for the methods also have resealing subroutines and other convenient techniques for adjusting the elements in the data entered. For instance often one wishes to experiment within a DPF pattern type. This implies there is a type for both the row data and column data, defined by restricting certain of their symmetries and other characteristics. Within the restrictions, one may parameterize the possibilities allowed for the row and column data types and use this as a front end for our computational procedures. The user then experiments efficiently with these parameters, which generate the row and column data, which in turn generates the DPF within the selected pattern type. This is further discussed in Section 11.

3 Two Cross Section Method 3.1 Overview

This method generates DPFs directly in three-space and has various generalizations. In the simplest form, the user enters a row and column cross sections by simply naming their vertices on a coordinate plane. The cross-sections can be designed effortlessly. The resulting infinite table contains DPFs with great commercial application. Moreover the direct relationship between the data entered and the resulting structure will enable engineers to design materials with custom performance properties. For both chains a variety of front ends are possible, such as entering a single unit of repetition may be entered along with the number of repetitions desired in each direction, or using a computer code to generate the chains within selected parametric conditions. The designer typically selects a general DPF pattern type from the infinite array for its structural characteristics, and then optimizes the parameters in that pattern type by adjusting the parameters in the corresponding RCS and CCS wave types. Even by changing just the proportions within the two cross-sections, the qualities of the DPF can change widely.

3.2 Technical Procedure

Figure 4:
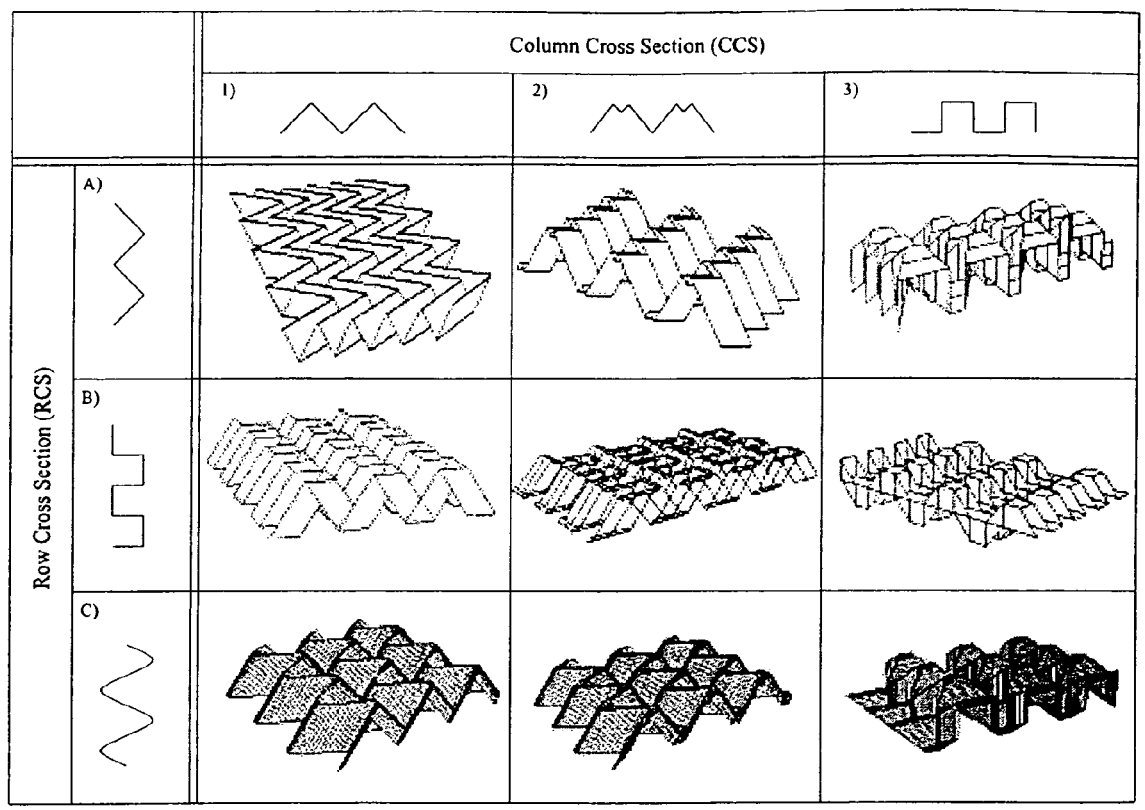
FIG. 4 illustrates an array of DPFs generated by using Row Cross Section (RCS) and Column Cross Section (CCS).

This method is perhaps the easiest to use. The user enters the row cross-section (RCS) and the column cross-section (CCS) onto an XZ-plane and a YZ-plane, respectively. Optionally the row and column repetition numbers may be factored out, and the data entered may be represented by the two-dimensional vertices of the PL curves as described previously. The x-axis of the RCS is used as a reference line, and the RCS given should have no undercuts. In FIG. 4, 'A, B, C' show three row cross sections and the '1, 2, 3' show three column cross sections. For 'C' the RCS is a sine wave (not a PL curve) and so the DPFs generated are outside the simplest class. Note for pictorial quality the data is not to scale and the RCS and CCS are shown to two repetitions, while the DPFs are shown to at least three repetitions in each direction.

The idea is to position each facet-row in three-space, and then attach them along their common edge-rows. −RCS will denote the reflection of RCS about its x-axis, and RCS and −RCS will denote the usual corrugation-type surfaces formed by extending RCS and −RCS from the XZ-plane to three-space in the direction parallel to the y-axis.

The reference plane of these two surface is then the XY plane. Facet-rows will be taken from RCS and −RCS alternately, and positioned sequentially according to the segments of CCS. To do this, label the consecutive edges of CCS with +1 and −1 alternately. The YZ plane containing CCS should be considered as usual to lie in the XYZ space. On each segment of CCS labeled +1, position a copy of RCS so that its reference plane contains the segment, its reference plane is normal to the YZ plane, and has not shifted in the x direction. Likewise, position −RCS on the remaining edges of CCS labeled with −1.

Corresponding and parallel to the original series of edges in CCS, we now have a series of corrugation surfaces. Each of these consecutive surfaces should be cropped along the curve where it intersects the two adjacent corrugation surfaces in the series. These cropped corrugation surfaces then splice together to make the DPF.

Figure 5:
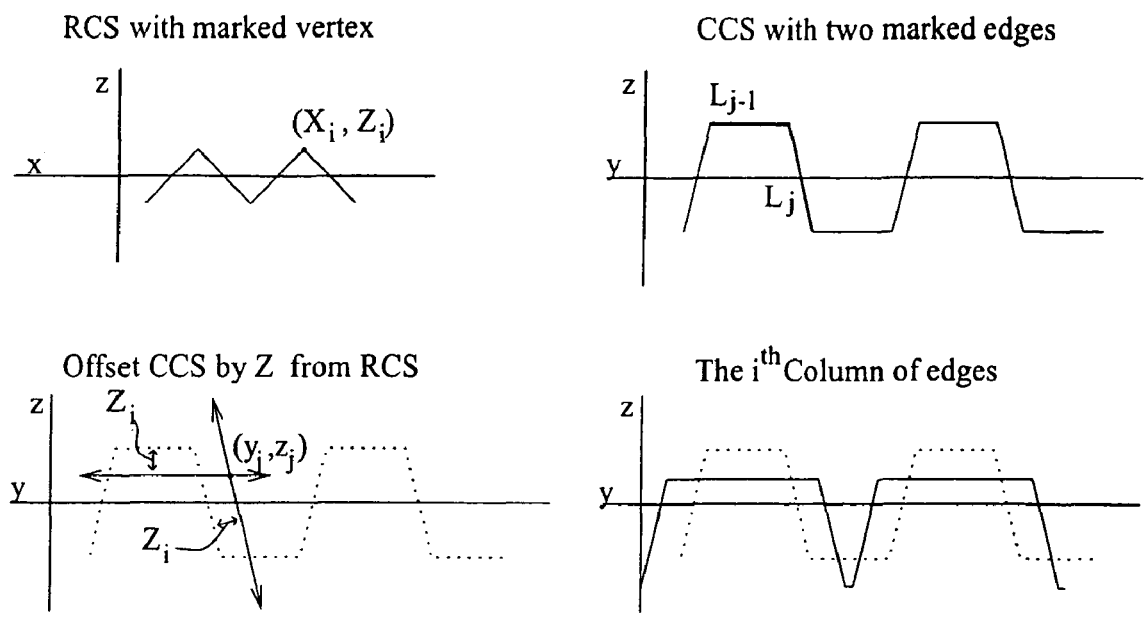
FIG. 5 illustrates Z-values of RCS are the offsets on the CCS.
Figure 6:
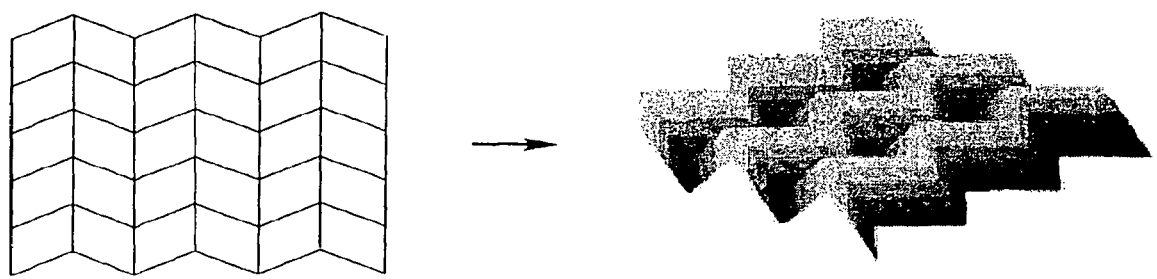
FIG. 6 shows a simple folding tessellation according to the present invention.

Alternatively, RCS and CCS may be used to construct the DPF by generating the collection of column cross-sections of the DPF obtained by intersecting it with each plane parallel to the YZ-plane. To determine the shape of these column cross-sections, consider a point (x0, z0) on the RCS. The column cross-section in the $\{x0\} \times R \times R$ plane will be the same as the original CCS, but offset according to z0. To do this the segments L of CCS are assigned a plus/minus value as above. For segment L on CCS, a new L' is drawn parallel to L and at a distance of $|z0|$ from L, with L' above or below L according to the product of the signs of z0 and L. To finish this column cross section in the $\{x0\} \times R \times R$ plane, the various L' produced from the sequence of segments in CCS are extended or cropped to join their ends sequentially. FIG. 5 shows an example.

To generate just the vertices of the DPF, the column cross-section need only be calculated for points (X,Z) that are vertices of RCS. The calculations for the Method may be computed in a number of ways. Suppose $(X_i, Z_i)$ is a vertex of RCS, and $L_{j-1}$ and $L_j$ are two consecutive edges of CCS. The value $Z_i$ represents how the vertex is offset from its centerline. Consider the line segment $L_{j-1}$ in the YZ plane, and let $L_{j-1'}$ be the line parallel to the segment and offset in the YZ plane be $Z_i$. $L_{j-1'}$ should be offset above or below depending on the product of the sign of $Z_i$ and the +/− label of the segment. Similarly define $L_{j'}$ offset from the line segment $L_j$. Calculate the point of intersection $(y_j, z_j) = L_{j-1'} \cap L_{j'}$. Then $(X_i, y_j, z_j)$ is a vertex of the DPF. This is shown in the third frame of FIG. 5.

In summary the x coordinate of the vertices requires no calculations and the y and z coordinates are calculated by parallel and intersecting line formulas. The fourth frame of FIG. 5 shows the $i^{th}$ column of edges found in the $X_i \times R \times R$ plane.

4 Wave-Tessellation Method

4.1 Overview

The Wave-Tessellation Method described here produces the planar tessellations on the sheet material that specifies where the edge creases will be on the folded sheet. Additionally, the convexity of each crease is also specified. Of course for a generic tessellation to be the crease patterns is impossible, and in general it is quite difficult to design the fold crease tessellation without a system or design methodology. The fold crease tessellation is usually given independently of the final structure in three-space in which case additional information must be supplied. Knowing the fold crease tessellation is essential as a "parts list" showing the size and connection arrangement of the facets. The Wave-Tessellation Method may also be most suited for studying the flexural properties of a DPF under mechanical forces.

Tessellations outside DPF technology will most often have no or perhaps isolated three-dimensional positions possible. Tessellations generated by our Wave-Tessellation Method will have infinitely many three-dimensional positions, enabling the DPF to be produced simply, by stringing together these positions continuously, to give the Uniform DPF Process, as described in Section 16. An explanation of the failure of generic tessellations outside our Wave-Tessellation Method is also given there.

4.2 Constructing the Tessellation

Figure 7:
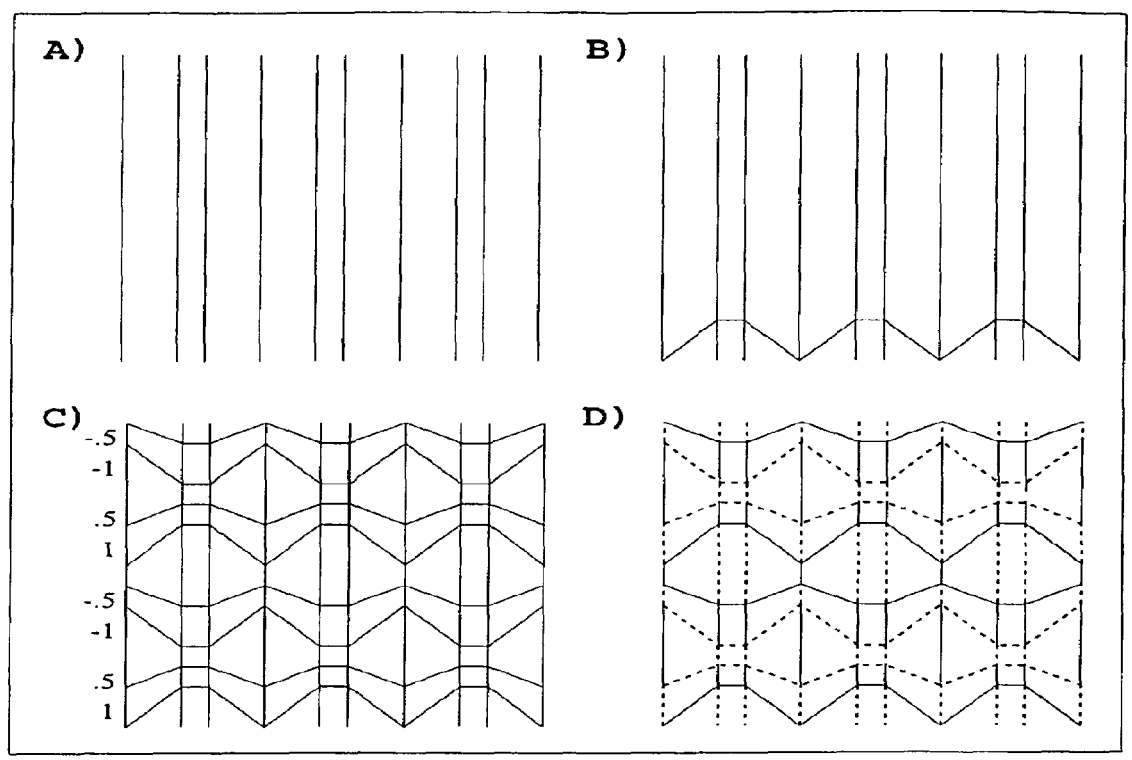
FIG. 7 illustrates steps (a) through (d) in the Wave-Tessellation Method.

The tessellation method is remarkably simple. Lines are drawn in the XY-plane parallel to the y axis and with periodic spacing. These will become the columns of edges. An example is shown in FIG. 7A. A piecewise-linear curve with one vertex on each column-line is drawn to serve as one of the rows of edges in the tessellation (RET) as shown in FIG. 7B. This curve is only required to project onto the x axis injectively, and should be periodic, although in practice it generally will have slope bounded within [−3,3]. Multiple copies of the row are placed on the plane by translating it in the y-direction. Additionally the row may be dilated in the y-direction with either positive or negative factors, with translates in the y-direction of the re-scaled rows placed on the plane. FIG. 7C shows scaling factors to the left of the rows.

For DPFs in the main class, the various copies of the row must not cross and they should have a periodic pattern in the y-direction. These minimal constraints produce a tessellation that if given the fold convexities described below, will fold into a DPF. For DPFs in the simplest class, the rows must not intersect and a balanced convexity condition must be met. These variations are discussed in Section 16.

The name 'Wave Tessellation' refers to the fact that the tessellation is constructed by essentially drawing multiple copies of the same 'waves' (RET) shifted and with various amplitudes.

4.3 Fold Convexity Specification

Since the edges in the tessellation are unfolded, a system of assigning fold convexities to the edges must be known in advance of the folding process. For DPFs designed by the Wave-Tessellation Method above, our system described below will satisfy the internal constraints of the sheet as a linkage and yield one parameter of motion. For generic tessellations outside our methodology, other complex systems of assigning fold convexity may be necessary if the sheet can be folded at all.

The reader may follow the discussion on the Method for assigning the fold convexity to the edges of the tessellation along with FIG. 7D in which the solid lines become convex folds and the dotted lines become concave folds. The edges within any single row will all have the same convexity. The convexity of the initial row is selected (convex in the figure). For any two neighboring rows, consider the ratio of their scaling factors. If the ratio is positive, the neighboring rows have opposite convexities, and if the ratio is negative then the neighboring rows are given like convexities. This enables all of the rows to be given a convexity assignment.

Figure 8:
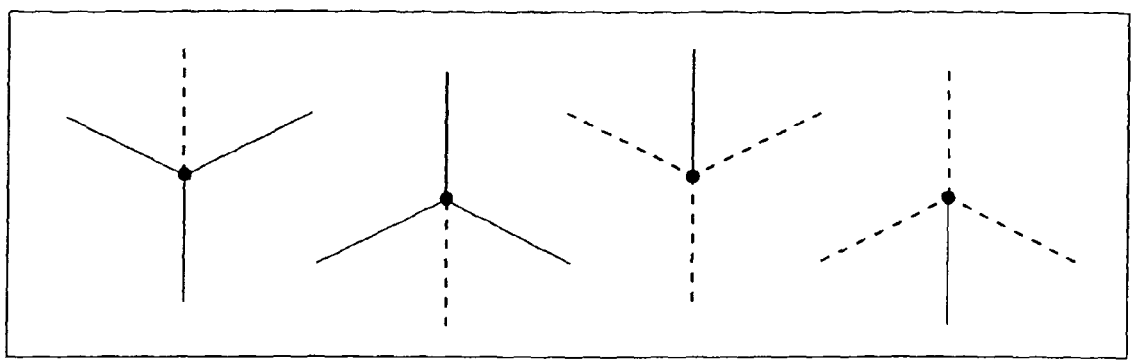
FIG. 8 illustrates fold convexity at a Vertex.

Next the convexity of each column edge can be calculated locally by examining the vertex at either of its endpoints and knowing the row convexity at that vertex. A schematic of the possible relationships between a column edge convexity and the row edge convexity is shown in FIG. 8, with the solid and dashed lines indicating convex and concave folds, respectively. At each vertex the row (generally horizontal in the figure) will divide the surface into two angles that total 360 degrees. The column edge that is on the larger side of the row should have the same convexity as the row, and the column edge on the smaller side should have the opposite convexity. This implies the convexities of the edges in the column chains alternate each time they cross a row. As each column edge has a convexity that can be determined from either of its endpoints, there is a redundancy to this Method that can be shown to specify the fold convexities consistently.

4.4 Computation Formula

For computer entry data, select an initial wave $W_0:R \rightarrow R$, seen as the graph of a function in the XY-plane, positioned so $W_0(0)=0$. This is RET, and for PL waves $W_0$ may be specified succinctly by naming its vertices (xy). The position of wave $W_n$ may then be defined inductively. Each wave $W_n$ has a pair of $(y_n, a_n)$, where $y_n$ is the incremental spacing on the y-axis, $y_n = W_n(0) - W_{n-1}(0)$, and $a_n$ is the amplitude for $W_n$ relative to $W_0$. The sequence $\{(y_1, a_1), (y_2, a_2), \ldots\}$ is called CET, usually written explicitly only up to one cycle of repetition. Conversely from CET and RET one constructs $W_n$ by $$W_n(x) := a_n W_0(x) + W_{n-1}(0) + y_n = a_n W_0(x) + y_1 + y_2 + \ldots y_n$$

5 Wave-Fold Method

This method is one of the most intuitive. The terminology emphasizes that edges in a row all have the same fold convexity by viewing each row of edges as a single "wave fold". The user enters either a row of edges on the tessellation (RET) or a row of edges on the folded DPF (RED), and enters the column cross-section (CCS) in the folded DPF. Depending upon whether RET or RED is used for the row data, the method can proceed along two different ways.

5.1 General Description of Method

Assume first that RED data is given. One of the potential applications for using RED is that it can be designed as the contact area where a DPF core material meets the laminated faces, and customizing this junction has structural and gluing ramifications. As mentioned RED is a coplanar PL curve and can be specified by two-dimensional vertices in some AZ-plane. The point where RED and CCS intersect must be specified in the data. The point will be a vertex of CCS. For convenience, the placement of RED on the XZ-plane is given with the x-axis passing through this point. The x-axis will be used as a reference line for RED. The PL curve CCS is given by its two-dimensional vertices in the YZ-plane. The Method proceeds by considering each vertex of CCS, its perpendicular bisector, and the plane in XYZ space normal to the bisector and containing the vertex. In XYZ space each of these planes is parallel to the x-axis, and tangent to its defining vertex of CCS. On each of these planes a copy of RED is drawn such that the reference line of RED is parallel to the x-axis and passes through the vertex of CCS that defined the plane. The copies of RED are all positioned on each of these planes so that their x coordinates of RED have not changed.

The next task is to adjust the amplitudes of the copies of RED. The re-scaling will occur within the plane containing the copy, with the restriction that the reference line and the x coordinates remain fixed. The remaining axis of the plane will be re-scaled linearly with potentially a positive or negative coefficient.

The copy of RED lying in the plane tangent to the vertex of CCS specified as the intersection vertex is not re-scaled. From here the copies of RED are re-scaled consecutively, following the sequencing of the vertices of CCS that were used to construct their planes. Consider two consecutive vertices of CCS, and the corresponding consecutive copies of RED. We may assume the first copy of RED is scaled properly as the Method proceeds inductively. Select a vertex of the first copy of RED that is not on its centerline. Draw a segment from this vertex to the corresponding vertex of the second RED. Note these corresponding vertices have the same x coordinate. Thus the second RED can be re-scaled so that this segment is parallel to the segment in the YZ plane joining the considered vertices of CCS. This reduces the computations explicitly to simple plane manipulations and slope calculations. Section 5.2 below carries out this Method explicitly without using an inductive procedure to find the scaling factor of RED and the (x, y, z) coordinates of an arbitrary vertex of the DPF.

Instead of using the row data expressed as RED, it may be more convenient to express it as a row of edges in the tessellation, RET. This could be valuable if one wants to control the angles and x dimensions of the individual facets in the constructed DPF.

One proceeds similarly with the planes tangent to the vertices of CCS and perpendicular to their bisectors. One then determines the folded shape of RET at the vertex of CCS. This shape is of course RED, and so the Method can then proceed as explained using RED. Section 5.3 explains the conversion process from RET to RED.

5.2 Method for a Vertex

This section demonstrates the Method explicitly, and finds the scaling factor of RED and the (xyz) coordinates of the vertices of the DPF. To carry out the computations, call the $i^{th}$ vertex of RED $(X_i, Z_i)$ and the $j^{th}$ vertex of CCS $(y_j, z_j)$; we will calculate the $(i, j)^{th}$ vertex of the DPF. To simplify notation, for any vector u, $<u>=u/|u|$. Define the edge vector leading up to $(y_j, z_j)$ by $v_j = (y_j - y_{j-1}, z_j - z_{j-1})$. At each vertex $(y_j, z_j)$ of CCS, define $\gamma_j$ to be one half the included angle, and $b_j$ to be the unit bisecting vector. Then $$\gamma_j = \arccos(<-v_j> \cdot <v_{j+1}>)/2$$

$$b_j = <<v_{j+1}> - <v_j>>$$

Each copy of RED must be adjusted by an amplitude factor at each vertex of CCS. Assuming the specified intersection point of CCS and RED is given as $(y_1, z_1)$ on CCS and as X=0 on RED, the amplitude factor $k_j$ for RED at the vertex $(y_j, z_j)$ of CCS is $$k_j = (-1)^{\wedge}(j+1)\cos(\gamma_1)/\cos(\gamma_j)$$

The (i, j) vertex of the DPF is calculated to be (x, y, z) below $$x = X_i$$

$$y = y_j + k_j Z_i b_{jz}$$

$$z = z_j - k_j Z_i b_{jy}$$

Since there is no included angle on the first and last vertices of CCS, some convention such as having CCS start with (y0, z0) and not calculating RED on the ends of CCS is necessary.

5.3 Method Using RET

When the Wave-Fold Method uses RET for row data, it is easy to convert RET to RED and then apply either the recursive procedure in Section 5.1 or the formulation in Section 5.2. We assume again that RET and CCS intersect at $(X_0, Y_0)=(0,0)$ on RET and $(y_1, z_1)$ on CCS with one half the included angle at $\gamma_j$ located at $(y_j, z_j)$ on CCS.

RED will consist of a sequence of segments corresponding exactly in length to those on RET, but with their slopes adjusted. For segment $(X_{i-1},Y_{i-1})$, $(X_i,Y_i)$ its angle of ascent is $\alpha_i=\arctan((Y_{i-1}-Y_i)/(X_{i-1}-X_i))$ and length $l_i=\sqrt{((X_{i-1}-X_i)^2_2+(Y_{i-1}-Y_i)^2_2)}$. The corresponding segment on RED will have angle of ascent $$\delta_i=\arcsin(\sin(\alpha_i)/\sin(\gamma_i))$$

The vertex $(X_i,Z_i)$ on RED can be defined recursively as $$(X_0,Y_0)=(0,0)$$

$$(X_i,Z_i)=(X_{i-1}+l_i\cos(\delta_i),Z_{i-1}+l_i\sin(\delta_i))$$

These equations enable one to convert RET to RED. Additional formulas are in Section 9.

6 Strip Map Method

The Strip Map Method is unique among the DPF procedures in the way its column data (a column strip-map, CSM) and its row data (row cross-section, RCS) emphasize certain three-dimensional properties of a DPF. While defining a strip map to be used for the column data requires somewhat awkward data and a sub-Method of its own, there may be some advantages of using the Strip Map Method that out-weigh the added difficulty: this Method gives the greatest control over the silhouette and space surrounding the DPF; It has significant flexibility for generating DPFs outside the main class; and it displays natural limitations on the entry data for assuring the DPF is embedded. Before describing how the strip map is applied to produce the DPF, our strip map representation and sub-Method will be explained. The terminology Strip Map Procedure will refer to the sub-Method that determines the strip map from entry data and Strip Map Method will refer to the larger procedure that utilizes strip maps to produce DPFs.

A strip map can be explained heuristically quite easily, as a way of folding a rectangular piece of paper to lay flush on a plane. The actual computations, however, typically require techniques using re-iterative compositions, piecewise defined local isometrics of the plane, linear interpolations, and/or local coordinate systems defined on each facet. Furthermore, the strip and the strip map should be represented in data structure and methodology to interface well with designing strip maps and application of the strip map to the Strip Map Method to design DPF surface configurations. Additionally, the strip map should be reduced to numerical parameters that enable convenient manipulation for both the data entry of the strip map and the application of the strip map to DPF design. We have developed several procedures for representing, calculating, and designing strip maps that solve these difficulties. Before addressing the mechanism of our procedures, some formal definitions are given.

A local isometry $f: R^n \rightarrow R^m$, $n<=m$ is a piecewise smooth map that preserves arc length. That is if for all rectifiable $\gamma:[a,b]\rightarrow M$ $$\int |f(\gamma(s))'|ds = \int_{ab}|\gamma(s)'|ds.$$

For f: $G\rightarrow H$ with $G \subset R^n$ and $H \subset R^m$ the definition applies also. A strip is a rectangle $\{(y,z)|y\in J, z\in K\}$, where J and K are intervals. In practice K is usually many times shorter then J. A strip map is a local isometry from a strip to the plane.

6.1 Strip Map Procedure 1

Figure 9:
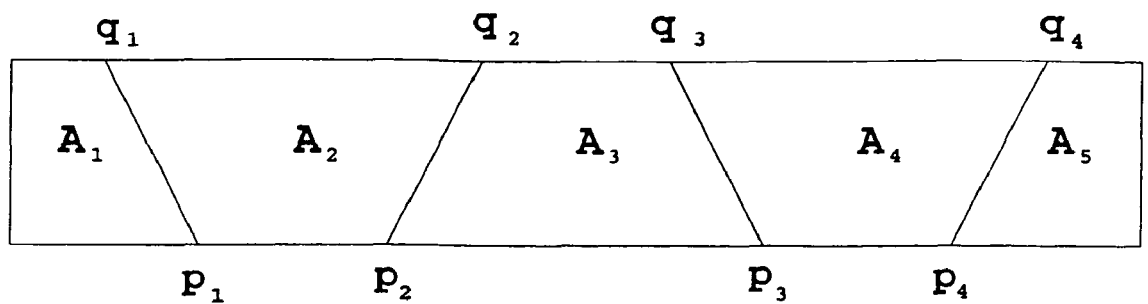
FIG. 9 illustrates fold locations on a strip.

This section discloses our first strip map Method, the one used to generate the images. It produces a continuous function from the strip to the plane, by applying the folds to the strip consecutively. In FIG. 9, the fold locations on the strip are shown as segments $(p_i, q_i)$. $F_i$ will denote folding the strip along segment $(p_i, q_i)$, keeping regions $A_j$, $j<=i$ fixed. The strip map will then be the composition $F_1 \cdot F_2 \cdot F_3 \cdot F_4$: strip$\rightarrow$plane. As the points' locations change with each successive folding, it becomes awkward to determine whether they should be left fixed or reflected by a map $F_i$ unless some additional data is attached to the points identifying in which regions they originated. For instance, use $l=l(y,z)$ as the subscript l of the region $A_l$ containing $(y,z)$: It is computed easily by simultaneous linear inequalities. Let $R_i$ be the reflection across line $(p_i,q_i)$. Then define the function $F_i$ on labeled points $(y,z,l)$ by $$(y,z,l) \text{ if } l<=i$$

$$F_i(y,z,l):=(R_i(y,z),l) \text{ Otherwise}$$

The strip map is then given using the composition $$F:=F_1 \cdot F_2 \cdot \ldots F_{n-1}$$

Note that for even complicated strip maps with interior fold vertices, the Method will define the strip map by letting $A_1 \ldots A_n$ be a path of regions connecting through the strip, and $R_i$ being the reflection across the lowest edge of $A_{i+1}$ used in the path. A rooted tree may be used instead of a path, where "<" becomes the partial ordering of the tree.

6.2 Strip Map Procedure 2

A strip map is singular on the fold creases and fold vertices. This Method uses the singular set to apply a polygonal structure to the strip before and after folding, with the edges and vertices of the polygonalization coinciding with the singularities or boundary, and the regions being the largest non-singular regions of the strip. These two polygonal structures are entered as data, and formatted so that the parts of strip polygonalization before folding are easily matched with the corresponding parts after folding in the image polygonalization. This added structure greatly simplifies the calculations within the Method.

There are many data structures for representing polygonal structures. For the strip in FIG. 9, it would suffice to enter an array of vertices $[[p_0 \ldots p_n],[q_0 \ldots q_n]]$ for the strip and the array of vertices $[[p_o' \ldots p_n'],[q_o' \ldots q_n']]$ for the image of strip, where the accent indicates the point's position in the folded strip. This rectangular grid representation will work easily for any strip map with vertices lying on the rectangle's perimeter. In some cases there may be triangular regions with two fold crease edges sharing the same endpoint vertex; in this case the vertex can be listed twice so that $(p_i,q_i)$ is still an edge for all i. For strip maps with interior vertices as in the last example of FIG. 11 a simple array will often be sufficient to describe the polygonalization, but again it may be necessary to use some redundancy in the listing of the vertices. More complicated data structures can be used. One representation uses a set of lists of vertices, where each list represents a polygon, by giving the vertices in cyclic order around the polygon's perimeter. In general the data entered need not be any more complicated than giving the vertices grouped in appropriate structure, for then with linear inequalities it is possible to determine the edges and polygons.

Once both the polygonalization of the unfolded and folded strip are entered as data with formatting to reveal their corresponding parts, the strip map is then determined by piecing together isometries that are defined locally on each polygon: Suppose (y,z) is a point on the strip lying in polygon $A_i$, and $A_i'$ is the corresponding polygon in the folded strip. Since $A_i$, and $A_i'$ are congruent, there is an isometry of the plane $F_i$ that sends the corresponding parts of $A_i$ to $A_i'$. In particular $F_i$(y,z) is (y',z'). To determine $F_i$, select three vertices u,v,w of $A_i$ that are non-collinear. Their image u',v',w' in $A_i'$ are found without calculation, by using the correspondence between the compatible data structure of $A_i$, and $A_i'$. Using the information that $F_i$ sends u,v,w to u',v',w' respectively, several geometric methods are given below for determining $F_i$. Thus by representing the strip before and after folding in corresponding formats to display the vertices in a described polygonal structure, all of the $F_i$ can be determined and hence the entire strip map. This key method has many applications to folding analysis and is described briefly below and again in Section 7.

Local coordinate systems on $A_i$ and $A_i'$ can be constructed so that corresponding points have the same parameterization. For instance barycentric coordinates on u,v,w are used in one of our computer codes, and then the parameters are used to reproduce the correct point on the folded strip by using the same barycentric coordinates on u',v',w'. The method in another of our computer codes uses two vertices u,v, and determines the unit vector n:=(v−u)/|v−u|; rotates n to find the perpendicular m; and uses this as the two basis vectors for a local orthonormal coordinate system with origin u. Likewise a local orthonormal coordinate system with origin u' is determined. The orientation of m' may be supplied by either a two coloring on the polygons of the strip or by including the corresponding vertices w on $A_i$ and w' on $A_i'$. The displacement vector s:=(y,z)−u is then converted using dot products in terms of the new coordinates by $s_1$:=n·s, an $s_2$:=m·s. The point (y',z') is calculated to be u'+$s_1$n'+$s_2$m'. This local coordinate systems method works well, and are layed out more explicitly in Section 7. Symbolically we get $F_i$(y,z)=(y',z'), where each polygon pair $A_i$,$A_i'$ results in different $F_i$.

The total strip map F is based on the individual $F_i$. If (y,z) lies in $A_i$, this will insure $F_i$(y,z) lies in $A_i'$, and is the correct point (y',z'). Thus to determine the effect of F on a point (y,z) on the strip, first determine which region $A_j$ contains (y,z), and then apply $F_j$. This is shown schematically in FIG. 10. The various $F_i$ may be calculated in advance before the Method receives the input (y,z), or each entry (y,z) may be used to find the vertices to apply to determining the function $F_j$.

An efficient variation of this procedure is to give a polygonalization of the unfolded strip, a selection of three vertices of each polygon, and the position of the selected vertices on the folded strip. This is essentially the same as above, but the polygonalization of the folded strip has been reduced to selected vertex correspondence. One proceeds as above with the local coordinate systems on each polygon, with base points the three selected vertices. The image of a point in a polygon is then determined using the same coordinates, but with base points the corresponding three vertices of the folded strip. Greater detail is described in Section 7.

6.3 Strip Map Procedure 3

This is our most recent Method for representing and calculating a strip map. The idea is that the entry data can simply be the polygonalization of the strip before folding; the Method can then calculate the polygonalization of the strip after folding and represent the folded strip in compatible format with the unfolded strip; and then proceed using isometries, local coordinate systems, or linear interpolation defined piecewise on the individual polygons as above in Strip Map Method 2. This reduces the entry data to just one polygonal structure, so that making design changes in the strip map is simplified.

We have several sub-procedures to construct the folded polygonalization from the unfolded polygonalization.

The Strip Map Method 1 can be applied to the vertices of the unfolded polygonalization, to get the vertices of the folded polygonalization, with the edge and polygon structure induced by correspondence.

Following a connection path or rooted tree out through the adjacency graph of the polygonalization (the dual of the polygonalization graph), the successive polygons can be attached alternating their orientations. One way to do this uses simple dot products.

The polygons may be two-colored. Polygons of one color are then all reflected into their mirror image. The polygons are then reassembled, reconnecting along previous shared edges. To connect the polygons, some procedure such as a path or tree through the adjacency graph of the polygons should be performed, providing a sequence for connecting the polygons.

A rooted planar tree on the edge graph is selected. Here planar means at each vertex the edges in the tree are presented in a list successively (for instance counter-clockwise), with the angle included between successive edges of the list known and containing no edges omitted from the tree. Using this information, there is a natural way to two-color the included angles so that it could be extended to a two coloring of the polygonalization. By knowing all the edge lengths, the included angles, and the position of the root edge, one can readily reconstruct the position of the vertices of the entire tree and hence the polygonalization. To find the folded polygonalization, the procedure is to reverse the sign of the included angles assigned one of the two colors, and then reconstruct the vertices of the tree, and so the folded polygonalization.

These sub-procedures are similar, and generally require iterative or sequential calculations to 'build' the folded polygonalization. Their programming is simplified, by copying the data format of the folded polygonalization from the data format of the unfolded polygonalization and the steps are then only required to change the vertex coordinates in the given polygonalization of the strip. Once computed the calculations for the general point (yz) are computed using Strip Map Method 2.

6.4 Variations

Figure 13:
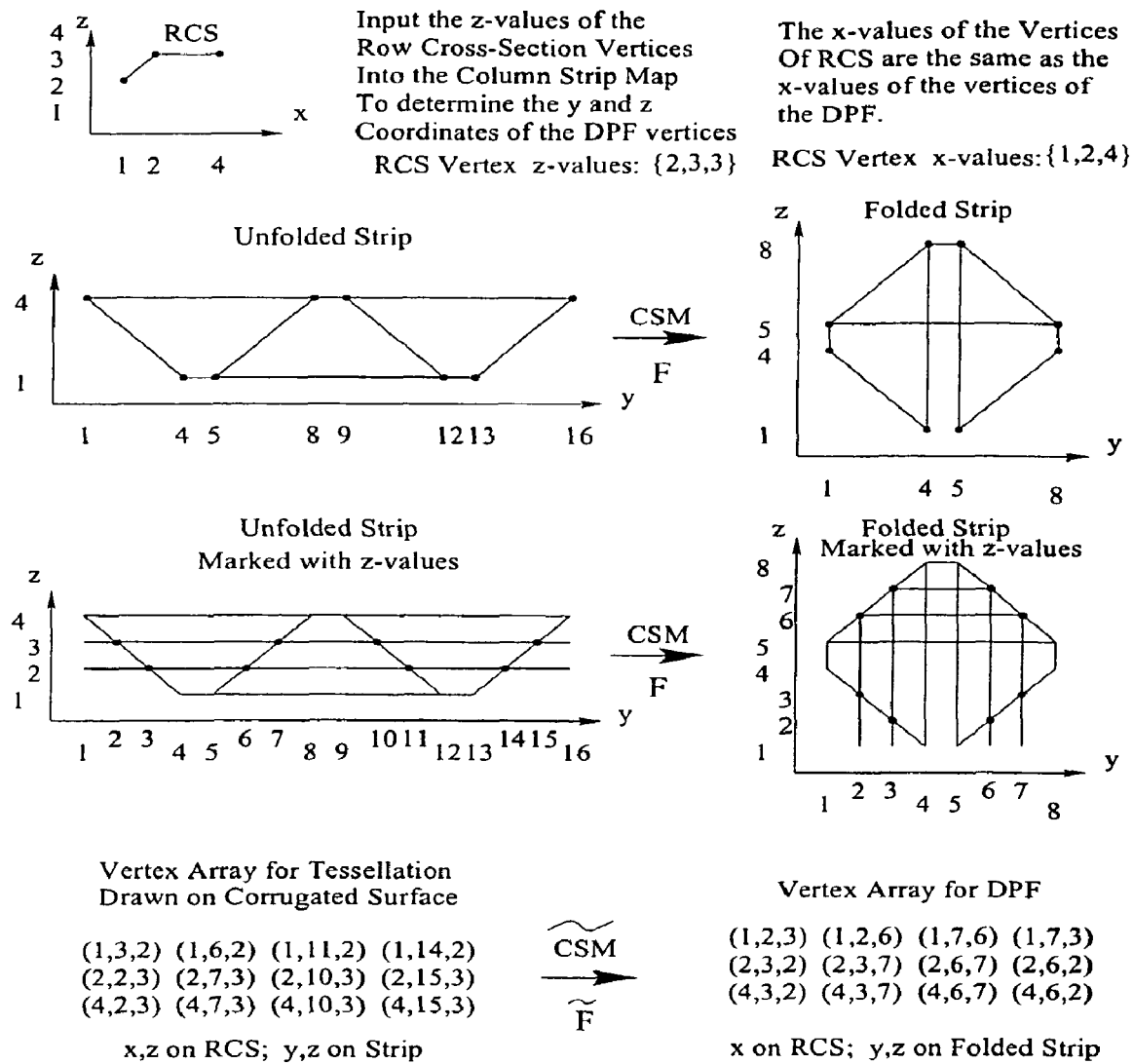
FIG. 13 shows vertex calculations with strip-maps to construct DPFs.

Depending on implementation, these procedures can be used to calculate the strip map on all points in the strip or for perhaps programming efficiency the strip map's effect on just the vertices of the strip. If the latter is employed one may then calculate the map's effect on the edges and polygons by interpolation as explained in Section 6.3 and Section 7, and thus construct the entire strip map if necessary for application. FIG. 13 shows an efficient method for calculating just the coordinates needed by the vertices of the DPF.

It is also possible to blend these procedures in various combinations. For instance given a polygonalization of the unfolded strip choose one base polygon to remain stationary under the folding map. To determine the location of a point on the strip map after folding, a path is selected from the point to the base polygon. Following this path the methods of Strip Map Procedure 3 may be employed to determine the point's destination. Another combination applies the variation in the end of the Strip Map Procedure 2 Section to Strip Map Procedure 3, so that instead of the polygonalization of the folded strip, only three vertices on each polygon are needed. One additional note, that reflections $F_i$ in Strip Map Method 1 are up to rigid motion of the YZ plane defined by $(y,z) \rightarrow (y,|z|)$.

6.5 Designing Strip Maps

To design a strip map, one may work experimentally with a strip of paper, and then compute geometrically the coordinates of the folds and vertices before folding and after folding, and then apply Strip Map Method 2. Alternatively just the unfolded coordinates may be calculated, and apply Strip Map Method 3. To proceed without experimentation, there is a constraint on the polygonalization of the unfolded strip: If the strip contains internal vertices the vertex must have an even number of adjacent edges and by adding and subtracting the angles around the vertex alternately the sum angle must equal zero.

Figure 11:
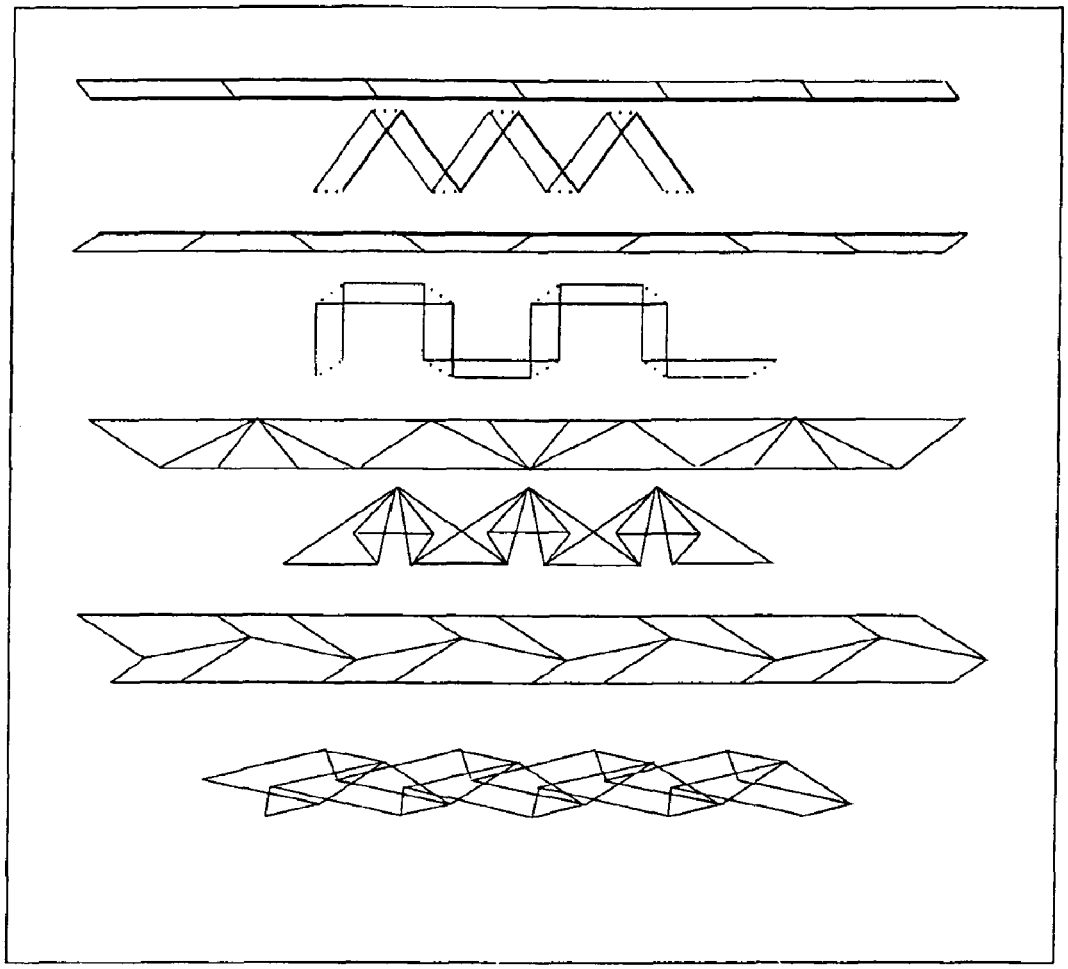
FIG. 11 illustrates several strip maps according to the present invention.

To produce periodic folded surfaces, the strip map f: $R \times [0,1] \rightarrow R^{\wedge}_2$ should be periodic, so for some minimal p>0 there is a translation v so $f(x,t)+v=f(x+p,t)$ for all $x \in R$, $t \in [0,1]$. To assure the folded structure has no interference problems, the strip map f should also be injective in the first coordinate, that is for all x,y $\in R$, $t \in [0,1]$, $f(x,t) < > f(y,t)$, when $x < > y$. FIG. 11 symbolically illustrates four examples that satisfy these periodic and injective properties, by showing the edges and vertices of the strip before and after folding. To reduce the pictures to numerical maps, one applies one of the strip map procedures given above.

6.6 Designing Surfaces by the Strip Map Method

A strip map is a function F from one two-dimensional region to another, $F(y,z)=(y',z')$. It may be extended to a function by $G(x,y,z)=(x,y',z')$. So, it has no effect on the x-coordinate and is just F on the y- and z-coordinates. The significance of G is that when it is applied to a zero-curvature surface S, it will produce a zero-curvature surface G(S). This follows as $G=I \times F$, where $I:R \rightarrow R$ is the identity, and set products of local isometries are again local isometries.

Figure 12:
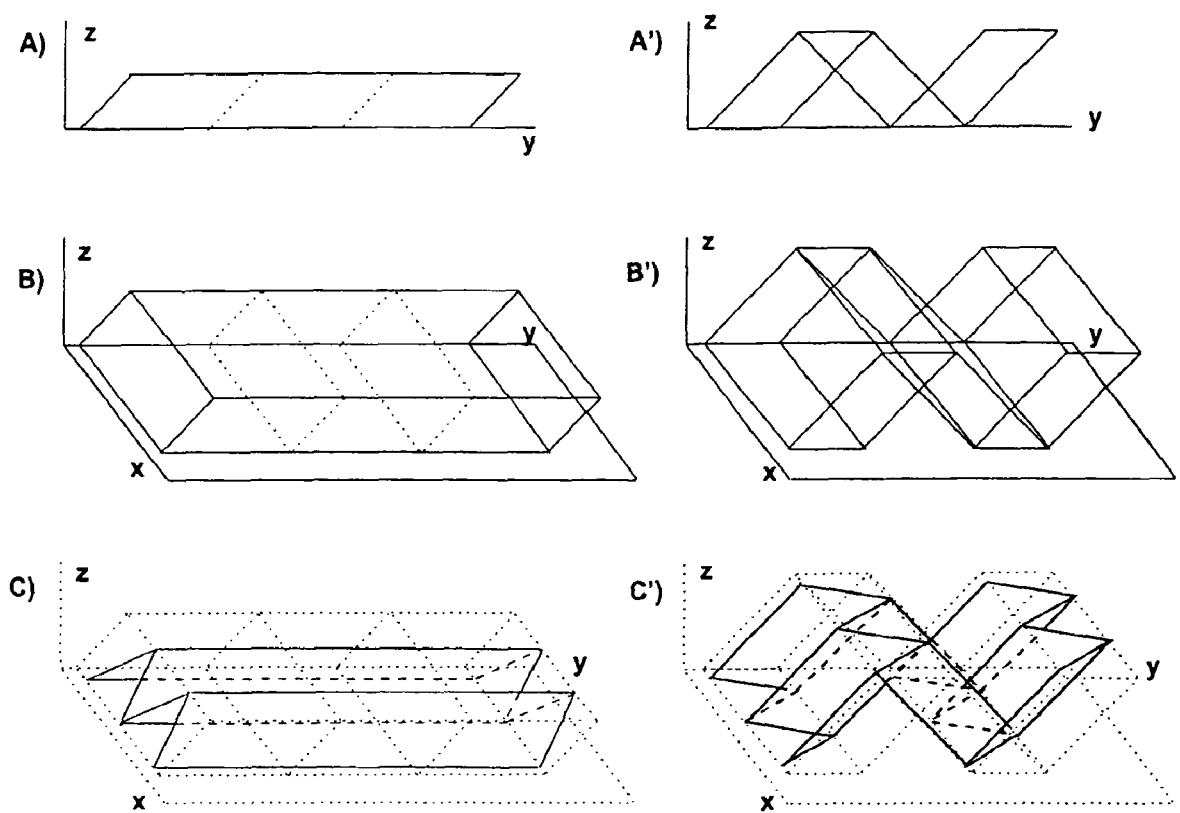
FIG. 12 illustrates the extending of a strip map to construct DPFs.

FIG. 12 show how a strip map F extends to and is applied to produce a DPF. In A) and A') of the figure, the strip in the yz-plane is seen before and after applying F. Parts B) and B') extend this to xyz-space, and the effect of on the rectangular box may be seen. In Part C), a standard corrugation surface S, having zero-curvature, is placed in the box. The Strip Map Method applies G to S, to produce the DPF surface G(S).

The Strip Map Method uses F:strip→plane and a zero-curvature surface S to produce a DPF. For DPFs in the main class, the cross section of S taken in any plane parallel to the xz-plane will give the same curve. This curve is the row cross-section (RCS) of the DPF. Note the z-coordinate of RCS composes with the z-coordinate of the strip map. The strip I×J used for the domain of F must have height interval J sufficient to contain the vertical variation of RCS. Also, the plane of RCS is perpendicular to the interval I of the strip. With these assumptions the strip map is called a column strip map (CSM) and the Method uses RCS and CSM as entry data.

As described above, the strip map F is extended to a map G:Box→$R^{\wedge}_3$. The corrugated surface S is designed to fit in the box, and then G(S) is the DPF. As it is easy to construct a map g:$R^{\wedge}_2 \rightarrow S$ presenting the corrugation, as an option one may define G·g: $R^{\wedge}_2 \rightarrow R^{\wedge}_3$ to give the map from the unfolded plane to the DPF in three space. Whether using G or G·g, the method as described so far gives the DPF as a continuous image of a local isometry function. This has been implemented in MAPLE computer code.

Alternatively, it is perhaps computationally more efficient and precise to determine the effect of the strip map on the vertices of the DPF, along with the edge and polygonal structure. If needed the full continuous maps G·g and G can be deduced by isometric interpolation, as explained in Section 7. The surfaces $R^{\wedge}_2$ and S can be polygonalized on their singular set, so that G·g: $R^{\wedge}_2 \rightarrow$ DPF and G|S→DPF are presented by defining the vertex correspondence. FIG. 13 demonstrates an efficient Method for determining the vertices needed.

The Strip Map method offers an indirect picture of the position of the surface in three-space. This method is most valuable for designing DPFs with surface portions arranged in close tolerance without intersecting. To assure the DPF will embed in $R^{\wedge}_3$, two sufficient conditions can be met. First, the RCS curve $\gamma \subset R \times [0,1]$ should project $R \times [0,1] \rightarrow R$ injectively. This is the usual condition. Secondly the strip map F:$R \times [0,1] \rightarrow R^{\wedge}_2$ should be injective on each line $R \times \{t\}$ for each $t \in [0,1]$. The embeddedness follows immediately from the injectivity hypothesis on F and RCS. The surface generated will be doubly periodic if both F and RCS have one direction of periodicity.

Additionally, we comment that the strip map method is not restricted to the use of rectangular strips as described here for simplicity, so long as it is a local isometry. Also a variation rotates the surface S about a vertical line before applying G.

7 Representation for Folded Structures

In many cases it is useful to describe the function that carries points on the unfolded sheet to their locations on the folded sheet. Such a function can also be relate related to a structure on the unfolded sheet with the corresponding structure on the folded sheet. For instance, such a function can describe the correspondence between the components (vertices, edges, polygons) of the unfolded tessellation with the components of the folded surface. For fiber composites, the function may be extended to the tangent space to relate the thread direction of the sheet before folding with the thread direction after folding. Similarly for perforated materials, the function extends to map the perforations in the unfolded sheet to those on the folded sheet. We have developed a simple method for representing such a function, in the case where the folded sheet has linear facets or can be approximated by a zero-curvature surface with linear facets.

The method is uniquely related to folded surfaces. Surfaces that are produced by conventional manufacturing processes such as stamping, casting, and forging and that do not have zero-curvature can not be represented by this method. Conversely while there are many ways to represent a general surface, this Method is uniquely efficient in its exploitation of the arc-length-preserving characteristic of folding maps, enabling the entire function to be interpolated from a sparse data point correspondence, using local isometries expressed through simple coordinate systems.

The unfolded sheet has a singular set consisting of vertices and edges, as does the folded sheet. These give a polygonalization on both surfaces. Suppose $v_i=(x_i,y_i,z_i)$ is a vertex (the $z_i$ may be omitted on the unfolded sheet). An edge can then be described by listing its two endpoints. If $v_1=(x_1,y_1,z_1)$ and $v_2=(x_2,y_2,z_2)$ are its two endpoints, the points along the edge are described by $(1-t)v_1+tv_2$, where $0<=t<=1$. As before z may be omitted for the unfolded sheet. A polygon region can be described by listing its vertices cyclically, $P=(v_1,v_2,\ldots v_n)$. To check if on the unfolded sheet, the point (x,y) lies in the polygon $((x_1,y_1), (x_2,y_2), \ldots (x_n,y_n))$ one may determine if $$(x-x_k)(y_{k+1}-y_k)-(y-y_k)(x_{k+1}-x_k)<0$$

for all $1<=k<=n$

The three dimensional case can be handled similarly by first rotating the facet to lie in the XY-plane or by using vector operations. For a point p known to lie in a polygon region $(v_1, v_2, \ldots v_n)$ in two or three dimensions, we have several methods to re-coordinatize p relative to its polygon vertices. Three vertices u,v,w should be selected from $(v_1, v_2, \ldots v_n)$. In each of the examples below, new coordinates a, b (and c) are determined by solving the given equations.

1. Barycentric Coordinates: With $a+b+c=1$ $$p=au+bv+cw$$

2. Linear Coordinates:

$$p=v+a(u-v)+b(w-v)$$

3. Orthonormal Coordinates:

$$p=ar+bt$$

where r,s,t is the orthonormal basis given by $$r=(u-v)/|u-v|, s=(u-v)\times(w-v)/(u-v)\times(w-v), t=r\times s$$

The user should choose a convenient rule for determining which vertices u,v,w of the polygon will be selected, and should choose a coordinate system such as one of those suggested above. Once done, the entire map is computed separately for each polygon P by generating the coordinates a,b above for each point p in P and then using a,b to generate p' with exactly the same equations but calculated using u',v',w' on the folded sheet, that correspond to u, v, w.

Figure 14:
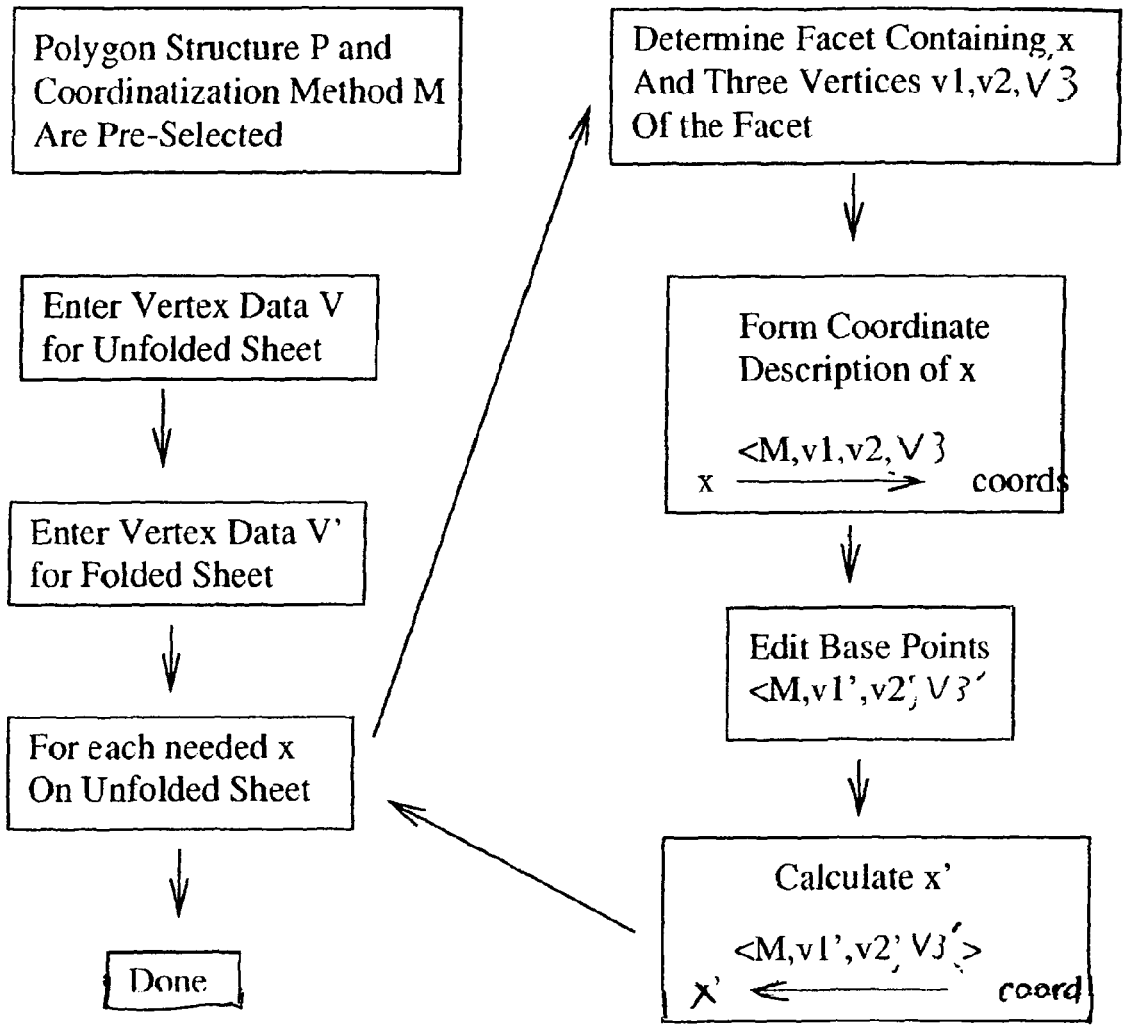
FIG. 14 is a flowchart of the procedure for determining the correspondence function from an Unfolded Sheet to a Folded Sheet according to an embodiment of the present invention.

The unique feature of this Method is that because it is describing a folding map that preserves arc-length, it can exploit the fact that the distance (intrinsic and extrinsic) relationships on each polygon expressing the points in terms of the vertices, are the same before and after folding. This enables a coordinate system on a polygon of the unfolded sheet, with base points u, v, w, to transfer identically to a coordinate system on a polygon of the folded sheet, with base points u',v'w'. One way is to use isometric interpolation along the edge and polygons to determine the full surface. Effectively, the entire surface map is determined by the correspondence on the vertices, between the unfolded and folded sheet. This identical transferring of coordinate systems is quite novel, because sheet material formed into similar structures by state of the art methods can not be interpolated this way and generally would require complicated non-linear relationships. FIG. 14 shows a flowchart of the steps of the procedure. In the figure, x represents either a point p as above or a structure component on the unfolded sheet such as thread direction, perforation location, and others.

8 Local Isometry Method

The Local Isometry Method is versatile for generating DPFs and works with the zero-curvature properties of the DPF transparently. It describes DPFs as the image of a local isometry $F:R^\wedge_2 \to R^\wedge_3$. Points on the unfolded sheet are assigned their folded locations in three-space. As with the other methods, it may be advisable to compute F just on the singular set or just on the vertices, and then apply our isometric interpolation in Section 7 if the full map is needed.

There are many combinations of ways to construct DPFs by composing local isometries. In this section, we disclose data structures and methods for representing and calculating these functions. One word of caution, however: in general it is difficult to determine in advance if the abstract surfaces generated by this method contain self-intersections, so some additional screening (usually on a case by case basis) must be applied to determine the application to sheet materials. For simplicity in notation we will describe the case where the DPF is an infinite sheet, with it implied that for most applications the domain would be restricted to a finite sheet.

8.1 Background Examples

A folded sheet may be seen as the image of a local isometry $F:R^\wedge_2 \to R^\wedge_3$. Once produced F may be represented using the method of Section 7. To design or create a local isometry $F:R^\wedge_2 \to R^\wedge_3$ is much more difficult. The method in this section constructs local isometries $F:R^\wedge_2 \to R^\wedge_3$ by combining several simple local isometries through set products and composition. The method is illustrated with a first example: Define $\Xi:R \to R$ by sending even integers to 0 and odd integers to 1 and extending linearly:

$$\Xi(2Z)=\{0\}, \Xi(2Z+1)=\{1\},$$

and $d\Xi|(n,n+1)=\pm1$, where the sign corresponds to the parity of $n \in Z$. $\Xi$ is a local isometry that folds the line onto the unit interval. Let $I:R \to R$ be the identity, then $I \times I \times \Xi: R^\wedge_3 \to R^\wedge_2 \times [0,1]$ folds three-space into the unit slab.

Figure 15:
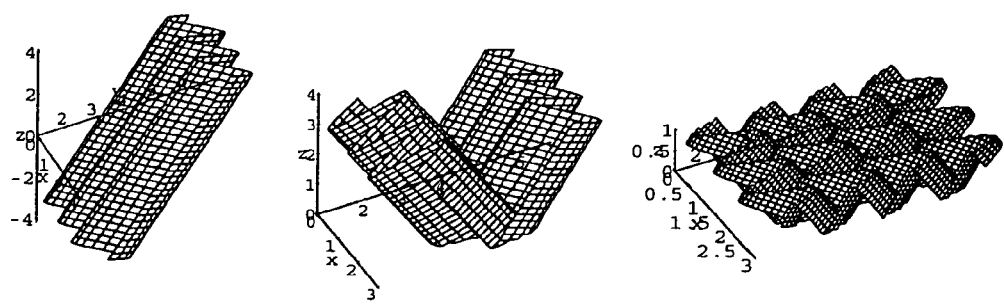
FIG. 15 illustrates compositions of Local Isometries.

Suppose $\gamma: R \to R^\wedge_2$ is a sine curve parameterized by arc length, and so $\gamma \times I: R^\wedge_2 \to R^\wedge_3$ embeds a corrugation surface. Choose a rotation $\rho:R^\wedge_3 \to R^\wedge_3$ so that $\rho(\gamma \times I)(R^\wedge_2)$ is as in FIG. 15a. Lastly compose with $I \times I \times \Xi$ so that $(I \times I \times \Xi) \cdot p \cdot (\gamma \times I)(R_2)$ is as in FIG. 15c. A priori the surface has zero-curvature; the double periodicity is verified easily using the periodicity of $\Xi$ and $\gamma$. In FIG. 15b, to illustrate the idea $\Xi$ has been replaced by the absolute value function ||. The choice of $\Xi$, $\rho$ and $\gamma$ in the construction are not constrained—other choices yield other DPFs. The only precaution is that the composition have the correct periodicity and be injective $R^\wedge_2 \to R^\wedge_3$.

This example can be generated by the other methods, as seen in FIG. 4C1, where $\gamma(R)$ is the RCS. If $\gamma(R)$ is replaced with a piecewise linear wave, such as in FIG. 28, W1-W8, and p is any non-orthogonal rotation of $R^\wedge_3$ parallel to the x-axis, the result will be in the simple class. The process could also be reiterated again so that $$(I \times I \times \Xi) \cdot \rho_2 \cdot (I \times I \times \Xi) \cdot \rho_1 \cdot (\gamma \times I)(R_2)$$

will be a folding tessellation if the rotations $\rho_1$ and $\rho_2$ are aligned so that the result is embedded and periodic. The key ingredient above is that the easy one-dimensional local isometry $\Xi$ was extended to a three dimensional local isometry $I \times I \times \Xi$. Any other one-dimensional local isometries can also be substituted into the formula.

To illustrate another composition of local isometries, select $o: [0,1] \times R \to R^\wedge_2$ to be a strip map (with the switch of coordinates). Then $I \times \sigma: R \times [0,1] \times R \to R^\wedge_3$ is a local isometry. Select $\gamma: R \to R \times [0,1]$ to be a PL local isometry (serving as the RCS) that projects injectively. Then $$(I \times \sigma) \cdot (\gamma \times I)(R_2)$$

is a DPF, also producible by the Strip Map Method with CSM $\sigma$ (usual coordinates) and RCS $\gamma$. But here if $\sigma_2$ is another strip map and if $\rho_1$ and $\rho_2$ are rotations chosen within bounds then $$(I \times \sigma_2) \cdot \rho_2 (I \times \sigma) \cdot \rho_1 \cdot (\gamma \times I)(R_2)$$

will be a DPF.

The inventor wrote a computer program to compute these compositions of local isometries, and return a DPF map $R^\wedge_2 \to R^\wedge_3$. By adjusting rotation angle the resulting surface may be given either a periodic or quasi-periodic structure, essentially due to the harmonic patterns between the composing maps.

8.2 Computations

Computer programs composing these simple local isometries can be written by persons of ordinary skill in the art. To study the results graphically however, computer mesh-point distances may be larger than the detail of F: $R^\wedge_2 \to R^\wedge_3$, totally missing the structure of some of facets of the DPF. This is a consequence of the likelihood for composing maps to interfere quasi-periodically, and generate some very small facet regions.

The significance of our method is how we generate the vertices of the DPF, to maintain full detail. Making vertices explicit is nearly essential (versus continuous function approach) since the detail in the facet geometry with experimental compositions could be quite small (in general it would have a limit of zero, by quasi-periodicity). To do this the singular sets of each of the composing functions must be given a data structure. It is difficult to use a simple array structure to define the vertices of the singular complexes because the vertex mesh becomes skewed with each composition, so a cw-complex data structure may be the easiest to implement. In general for two composing maps one can calculate the intersections of singular complexes of adjacent functions in the composition, to determine the cw-complex data structure for the composition. Calculating the vertices in the intersection requires searching for which lines and hyperplanes intersect between the two maps. This is described below, and then a simpler method is described exploiting the fact that the composition always starts with $R^\wedge_2$ on the right.

A first approach is to enter the maps defined by giving the correspondence between the vertices of the singular sets before and after applying $f_i$, with the edge, polygon, and polyhedron structures given in terms of these vertices and the full map defined by isometric interpolation as in Section 7. Then for $f_2 \cdot f_1: R^\wedge_3 \to R^\wedge_3$ one calculates the intersection I of the singular set in the domain of $f_2$ and the singular set in the range of $f_1$, and use $f_{1\ (-1)}(I)$ and $f_2(I)$ to construct the singular sets in the domain and range respectively of $f_2 \cdot f_1$. This enables $f_2 \cdot f_1$ to be represented by giving the correspondence between the vertices of the singular sets before and after applying the new function. By repeating the procedure, longer compositions $f_n \cdot \ldots f_1$ can also be represented by the correspondence between the singular sets of the domain and range.

Our preferred method is a variation of above, that leaves the composing maps in their original representation, and calculate $f_n \cdot \ldots f_2 \cdot f_1: R^\wedge_2 \to R^\wedge_3$ on the singular set working from the right. Since $f_i$ has a two dimensional domain this will simplify the calculations considerably. Many of the other $f_i$ are rotations or translations and they can be left as matrixes or vector addition. The other three dimensional local isometries $f_j$: $R^\wedge_3 \to R^\wedge_3$ will be products of one or two dimensional local isometries, with a product structure on their singular sets. As the Method calculates $f_1(R^\wedge_2), f_2 \cdot f_1(R^\wedge_2), f_3 \cdot f_2 \cdot f_1(R^\wedge_2), \ldots$ the image is a two-dimensional surface with a polygonalization. When the polygonalization for $f_{k-1} \cdot \ldots f_1(R^\wedge_2)$ has been calculated, and $f_k$ is a translation or rotation, $f_k$ is applied simply to the coordinates of the vertices in the polygonalization. Otherwise $f_k$ will be similar to a strip map and the new vertices and polygonal structure can be calculated as in FIG. 13 with mild adaptations. In short since the local isometry $$F := f_n \cdot \ldots f_i : R^\wedge_2 \to R^\wedge_3$$

starts with a two-dimensional $f_1$ and continues to use global isometries or isometries with simple product structure, the calculation for the cw-structure on the singular set may be reduced nearly to the two-dimensional case.

9 Inter-Relationships, Similarities, and Blends

In certain cases it may be advantageous to inter-blend two or more of our methods or methodologies. For example, potentially the user could want to use the row data from the Wave-Fold Method (RED) because of its definitive description of the row of edges on the folded DPF for perhaps bonding on another laminate, and the user may want to use the column data from the Strip-Map Method (CSM) for its versatility or to control the YZ-plane silhouette of the DPF, and the user may already have the geometrical calculations of the Two Cross-Section Method (intersecting offset lines) on their existing software.

The similarities among the features of these five methodologies in many cases enable one to translate from the features of one procedure or method to the features of another. These features include the type of input data, the geometrical procedure, the computational procedure, and the range of DPFs produced. For instance as explained shortly their types of row data are related by trigonometric formulas, as are the CCS and CET, and each CCS can be converted to a CSM. Furthermore their geometrical procedures are very compatible, and allow for blending of the various methods. This enables easy hybrid of methods, customized to meet the requirements of a specific application.

Two geometrical procedures were given for the Two Cross-Section Method, namely the splicing together of facet rows and an offset procedure for making the set of column cross sections. The Wave-Fold Method gave a recursive procedure for scaling the amplitude of successive copies of RED to get parallel column edges and a non-recursive procedure that used trigonometric relationships involving the half included angle of the vertices of CCS. For the main class of DPFs, the geometrical procedures for these two procedures are closely related in that intersecting points of the offset lines will always lie in the plane of the copies of RED and are equivalently determined by finding the scaling factor for RED. Moreover the location of these points may also be understood and calculated by a reflection phenomenon, which is roughly the approach of the Strip-Map Method. FIG. 16 compares the geometrical procedure of these three methodologies. The dotted line represents a column of edges on the folded DPF (or any calculated column cross section). The similarities between the geometry of the methods can be dedeuced from the congruence of the figures' resulting dotted lines. Note in each case the x-coordinate of the row data is unchanged in the generated DPF, and thus it is sufficient that the figure only show the procedure in some YZ-plane.

Specific calculations, whether using intersecting offset lines, intersecting offset lines with reflection lines, applying reflections to offset lines, calculating scaling coefficients in normal direction to CCS vertex bisector, and others are also interchangeable after applying basic plane geometry identities.

As for the Wave-Tessellation Method, it may be seen as the limiting case for the Wave-Fold Method. Also after calculating the vertices of a DPF in the main class by any method, one of our computer programs will determine the original tessellation. To do this it calculates the edge lengths on the DPF and the facet included angles, and then reconstructs the tessellation on the plane. Alternatively one may convert directly to RET and CET with a procedure similar to reversing the procecedures of Section 16.

For the main class the CSM data is very similar to the CCS data. To convert a CSM data to CCS data, choose a $z_0$ in the strip, and apply the strip map to $R \times z_0$. The result will be a CCS capable of generating the same DPF. To convert CCS to CSM data, apply the Two-Cross Section Method using CCS and a RCS consisting of a single edge $[(0,z_1),(0,z_2)]$ where $z_1$ and $z_2$ are the minimum and maximum values for a RCS that the CCS can handle. The result will be a folded strip, that before folding was $R \times [z_1, z_2]$. Besides offering different conveniences on the main class, the difference between CSM and CCS lies in the way they generalize outside the main class.

The Composition of Local Isometries Method generalizes the Strip Map Method. A strip map is a two dimensional local isometry, and its product with the identity on R gives a three dimensional local isometry used for the compositions. Additionally the Wave-Fold Method defines a plane normal to the bisector of CCS, that is used in calculations as if it were a reflecting plane, where the process of reflecting is also a local isometry. However the Composition of Local Isometries Method allows for reiterations and other procedures.

Figure 18:
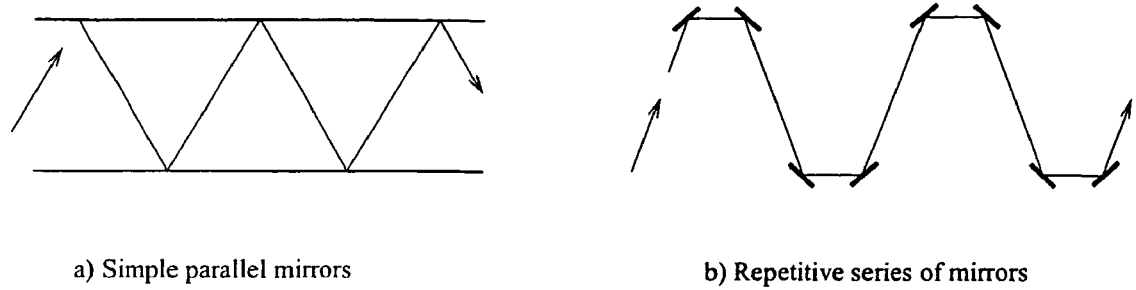
FIG. 18 illustrates two reflection patterns for a line.

To facilitate the conversion between the geometric procedures performed by the algorithms and methods, we offer the following explanation. If a line in the plane is reflected (envisioned as a beam of light) at some acute angle between two parallel mirrors in the plane, it will produce a zigzag shape (FIG. 18a). More complicated repetitive reflecting patterns for a line can be produced by applying a series of mirrors (FIG. 18b). Effectively, the CCS serves as the reflection pattern. Three of these reflection patterns are labeled "1,2,3" in FIG. 4. Reflection preserves arc length, so the resulting map induced by the reflections is a local isometry of the line. It is also possible to put a band around a reflection pattern for a line, and get a strip-map.

Figure 19:
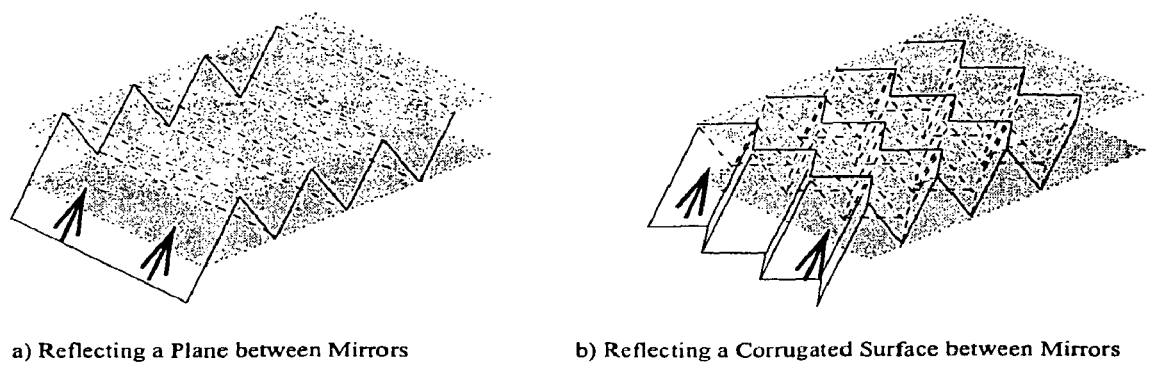
FIG. 19 illustrates a local Isometry applied to two surfaces.

Likewise to reflecting a line, a plane can be reflected by adapting the mirror arrangement to three-space. For example FIG. 19a is obtained by extending the reflection scheme of FIG. 18a. This will produce a conventional folding pattern for the plane. The resulting map induced by the reflections is a local isometry of the plane but the image has only one direction of periodicity and so is not a DPF. Instead of sending a plane to reflect between repetitive mirror arrangements, one may apply the mirrors to a corrugation-type surface (FIG. 19b).

The corrugation type surfaces can be specified by their cross section. Three of these cross-sections are labeled "A,B,C" in FIG. 4. The body of FIG. 4 can be interpreted as showing the result of applying the reflection schemes 1, 2, and 3 (labeled 'column cross sections' in the figure) to the corrugations having cross-sections A, B, and C.

Figure 17:
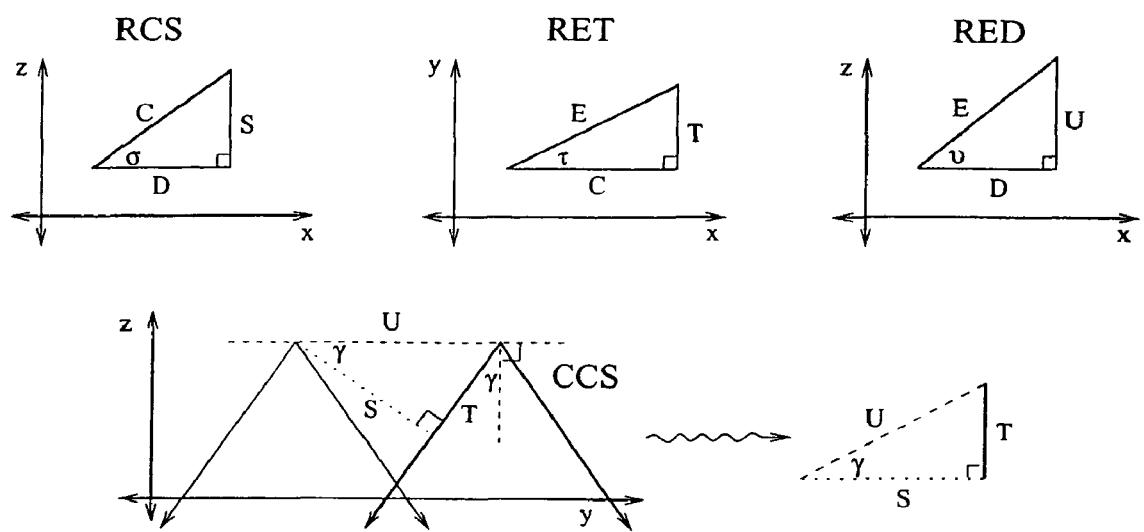
FIG. 17 illustrates the trigonometric relationships between entry data.

To further facilitate and disclose how to mix and blend features of our various procedures and methods, namely their row input data type, their column input data type, their geometrical procedures, and their calculation procedures, FIG. 17 is included showing the trigonometric relationships of RCS, RET, RED, CCS. With this information the user can customize our procedures and methods by mixing and blending their features.

FIG. 17 shows the relationships between the entry data for generating a single row-edge e on the DPF. The boldface segments under the headings RCS, RET and RED are the edge of the corresponding row entry data used to generate e. The additional triangles show the rise and run of the segments on the row data plane. Note the x-, y- and z-axes are labeled to agree with the convention for entry data established earlier, and become re-scaled and rotated differently under the various headings of the figure. The CCS vertex used to generate the row-edge e is shown in boldface on the bottom piece of the figure. The perpendicular bisector and the normal to the bisector are shown as dashed lines. The one-half included angle.gamma. is marked, and again in a congruent location. The right triangle formed using the dotted line S is reproduced for clarity on the lower right-hand corner.

The quantities C,D,E,S,T,U,$\sigma,\tau,\upsilon$ also do have geometrical significance. The angles $\sigma,\tau,\upsilon$ are seen on the entry data, as the angle of inclination of the row. The distance between the endpoints of e is E. The distance between the column segments, extended to parallel infinite lines, containing the endpoints of e is C. The distance between planes normal to the x-axis of the DPF and containing the endpoints of e is D. The lengths S,T,U appearing in under the headings RCS, RET, and RED are the (usually signed) rise in the entry data as shown in the right triangles. They appear again in the CCS right triangle in the lower portion of the figure.

With this the data types become quickly inter-formulated.

Another similarity of these five methodologies and their derivatives, is that they all generate DPFs by combining an infinite selection of row data with an infinite selection of column data. The fact that our Main Class has this array structure that indexes by rows and columns is novel and versatile.

10 Extension to the Main Class

The procedures and methodology discussed so far has focused on DPFs in the simple class. DPFs in the simple class have a tessellation with four-sided regions meeting four to a vertex, have edges that are straight line segments, and have an overall slab-like shape in the sense that it that fits between two parallel planes. The main class is very similar to the simple class, but may have triangular regions, curved edges, and/or an overall shape that is cylindrical for instance. DPFs in the main class can be produced by all of the procedures and methodologies.

It is easiest to extend from the simple class to include triangular regions in terms of the Wave-Tessellation Method. Consider two adjacent "waves" in the tessellation, with differing amplitudes. (The easiest case to see is with amplitudes of opposite sign.) By lessening the spacing between these waves until they coincide at some points without crossing, the DPF will gradually change with certain facets getting smaller until they disappear entirely. Facets in the same row adjacent to the disappearing facets will become triangles. Some vertices will increase in degree.

This can be accomplished in corresponding form by each of the methods. In the Two Cross-Section Method, if the RCS is tall enough the offset will be large enough (see FIG. 5) so that one of the offset segments calculated will have zero length. In the Strip-Map Method, if the strip has triangles or internal vertices, it is possible for the DPF to have triangles provided the RCS is positioned inside the strip to meet the vertices of exceptional degree. (Exceptional degree here means a horizontal open half-plane through a vertex contains two edges of the vertex.) The other methods produce triangular regions similarly.

To generate DPFs with curved facets by any method, simply use a non-linear row input data. For instance in FIG. 4C, a sine wave y is used for RCS with three different examples of CCS. FIG. 15a shows the a sine wave corrugation surface $R \times y = S$ with the application of the local isometry in FIG. 15c. FIG. 4C1 and FIG. 15c are essentially the same DPF, which could also be produced by applying the top strip map in FIG.

11 to this S. Other curves can be used for the row data RCS, RED, and RET, as well as pieced together linear and curved data.

For cylindrical overall shapes of the DPF, select a CCS on the YZ-plane with an overall cylindrical shape. The CCS may be a hexagon, an octagon, and other non-intersecting star shapes for example. This corresponds to a strip map of a finite strip that rejoins at the end. Arch-like DPFs can be constructed using arch-like column data.

DPFs in the main class can be described by all of the designing methods of Part I. There are additional extensions to the methods outside the main class. Some of the methods have extensions that do not easily apply to the others. Because of the inter-relationships between the various methods described in Section 9, in some cases or for some input data it will be possible to translate to another of our methods.

There are many traditional forming technologies that can be combined with our technology, such as perforating or re-enforcing the sheet before or after forming, either generally across the sheet or in coordination with the facet positions, splicing DPFs in design or material with other sheet products, and using a DPF as architectural base providing the substantial sheet placement, with deforming processes superimposed.

Part II Selected Structures and Features of DPF Technology

11 DPF Data and Pattern Type Parameterizations

Figure 25:
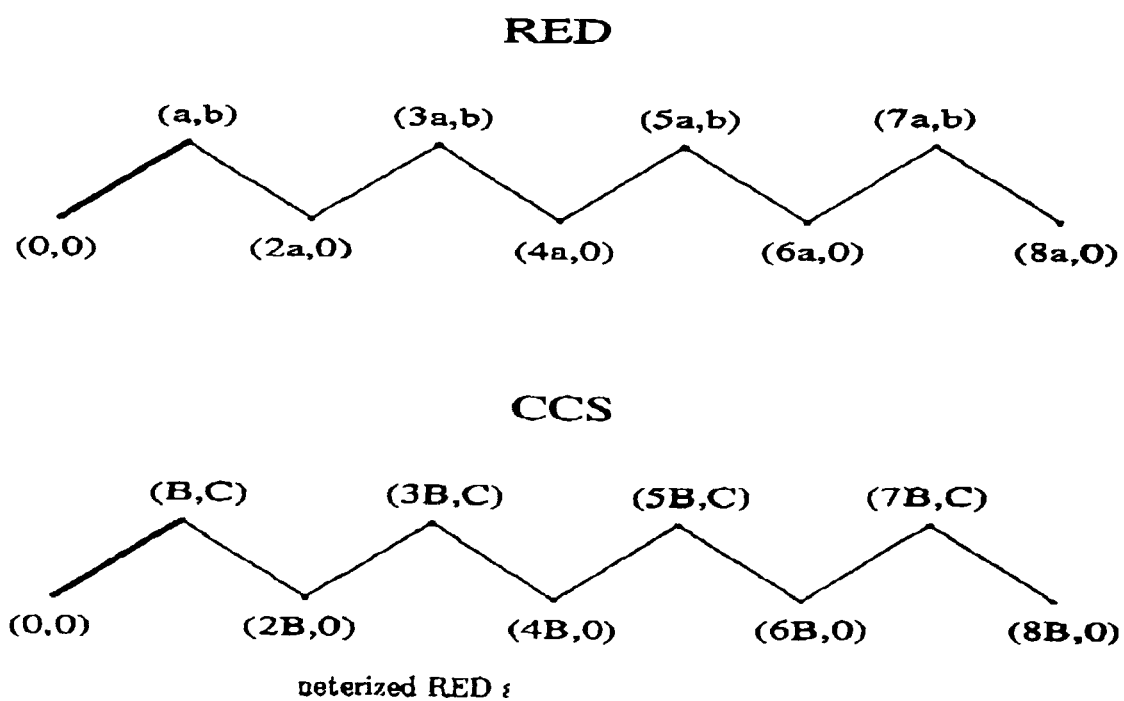
FIG. 25 illustrates parameterized RED and CCS data for a Chevron Pattern application.

This section demonstrates the use of our DPF technology to study a DPF pattern type through parameterization. This is key value when optimizing a given pattern type for a given application. Our method will be illustrated first for the DPF pattern type in FIG. 4A1, called the chevron pattern in the literature. The task is to represent the chevron pattern by convenient parameters, and study the effect of parameter variations. In this example the pattern will be used as a core material between two laminated faces. Since the rows of edges in the folded DPF are easily recognized as the ridges and valleys, and they describe the contact area to be glued to the faces, in this example we optionally chose RED for our column data type. The column data type CCS is selected because it immediately gives both the pitch (the spacing between successive ridges) and the thickness of the chevron pattern. RED and CCS are shown in FIG. 25 upper and lower portions of the figure, respectively. The first segment of both waves, shown in boldface in the figure, has been positioned with its initial end on (0,0). This way the parameters of the other endpoint of the segment entirely determine the segment and thus through symmetry the entire wave. The coordinates of the other vertices are shown. Thus RED is entirely determined by (a,b), and the CCS is entirely determined by (B,C), and the chevron pattern type has been reduced to independent vertex parameters (a,b,B,C).

Figure 26:
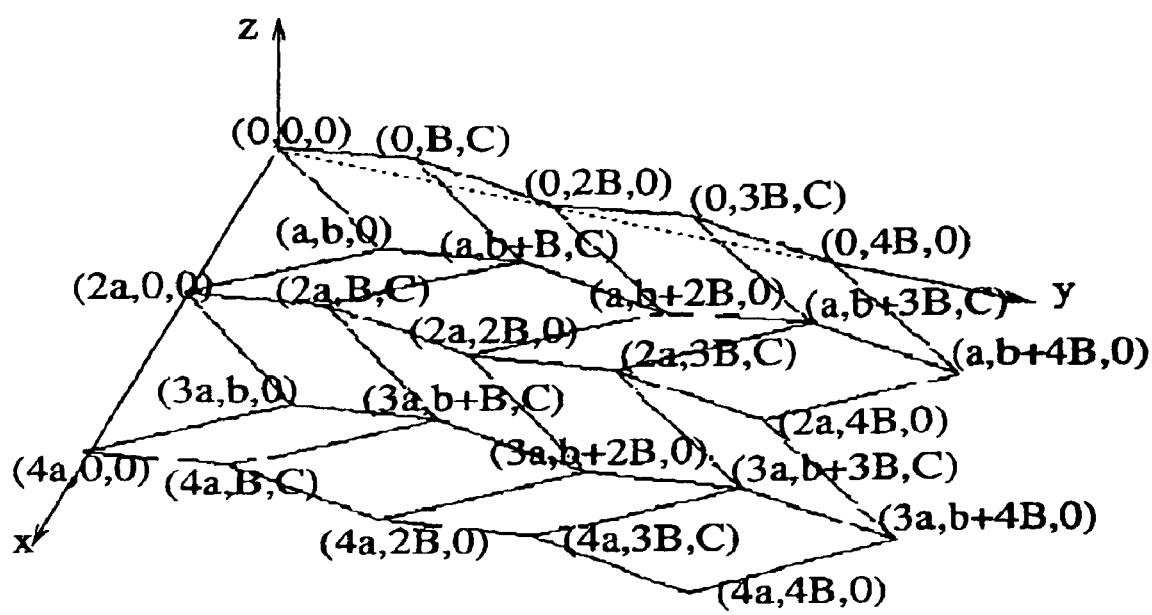
FIG. 26 illustrates vertex coordinates with DPF pattern type parameters.
Figure 32:
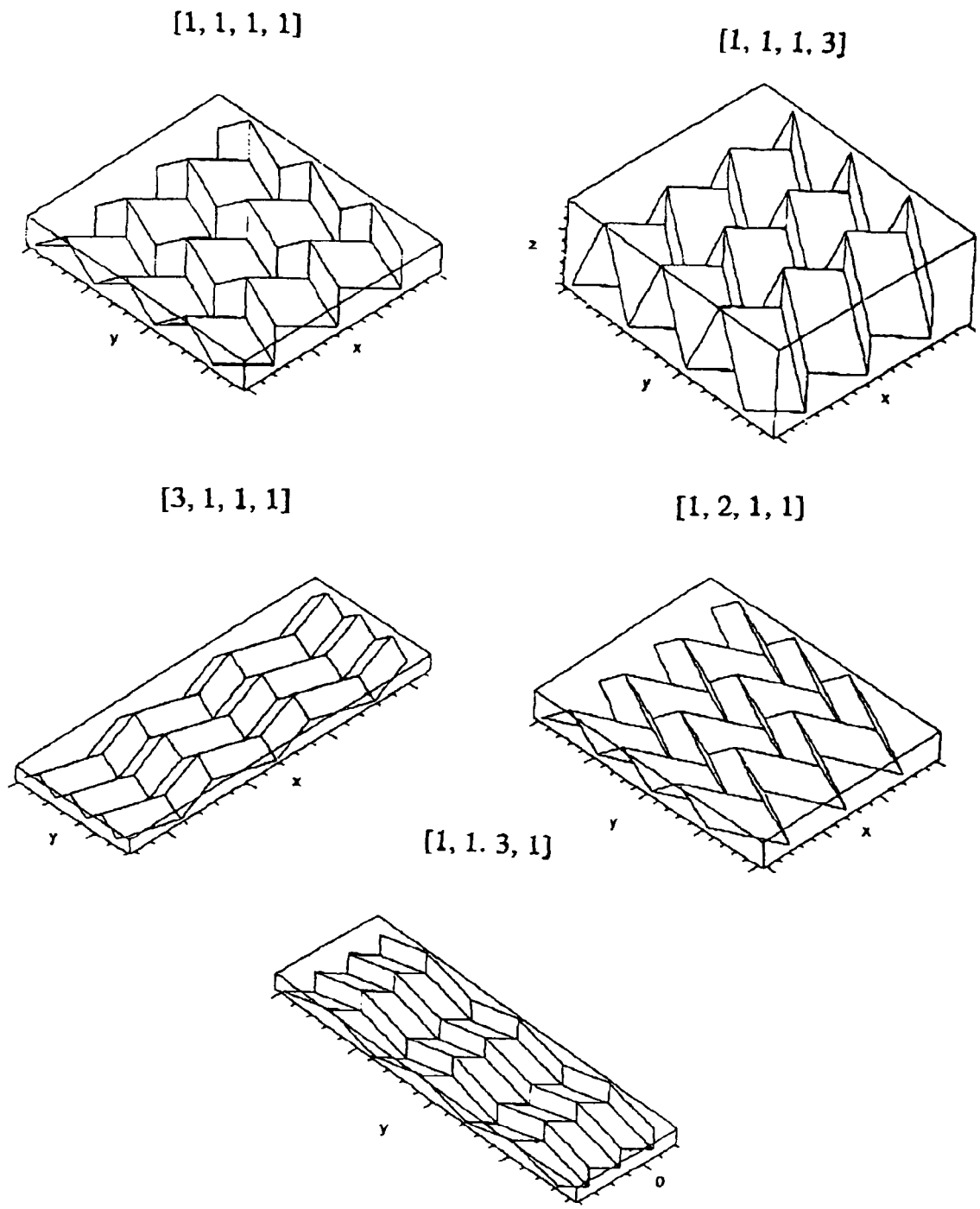
FIG. 32 illustrates five different frames with parameters overhead.

To generate the DPF vertices, one may substitute values into (a,b,B,C), calculate RED and CCS (or their units), and then use the Wave-Fold Method to generate the DPF with those parameters. Alternatively, one may run the un-evaluated parameters through the method to determine a variable description of the DPF vertices. To do the latter, since the planes normal to the bisectors of the vertices of CCS are all parallel to the XY plane, the scaling factors for all the copies of RED are all 1. With this the Wave-Fold Method produces a parameterized description of the vertices of the folded DPF, as depicted in FIG. 26. The (x,y,z) position of the vertex in the $m^{th}$ row and the $n^{th}$ column of edges is given in the table in FIG. 27. Note the rows run in the x-direction and the columns run in the y-direction, and the data was as in FIG. 25 so that the zero$^{th}$ row and zero$^{th}$ column vertex is at (0,0,0). FIG. 32 shows the chevron pattern under various values of (a,b,B,C) where a=x-extension of a row edge b=y-extension of a row edge B=½ pitch C=thickness interpreted directly from the definitions of RED and CCS.

Of course parameters other than (a,b,B,C) for the chevron family of DPFs also can be given by using RET or RCS instead of RED, by using CET or CSM instead of CCS, and/or applying obvious identities such as using polar coordinates to express the entry data.

Figure 28:
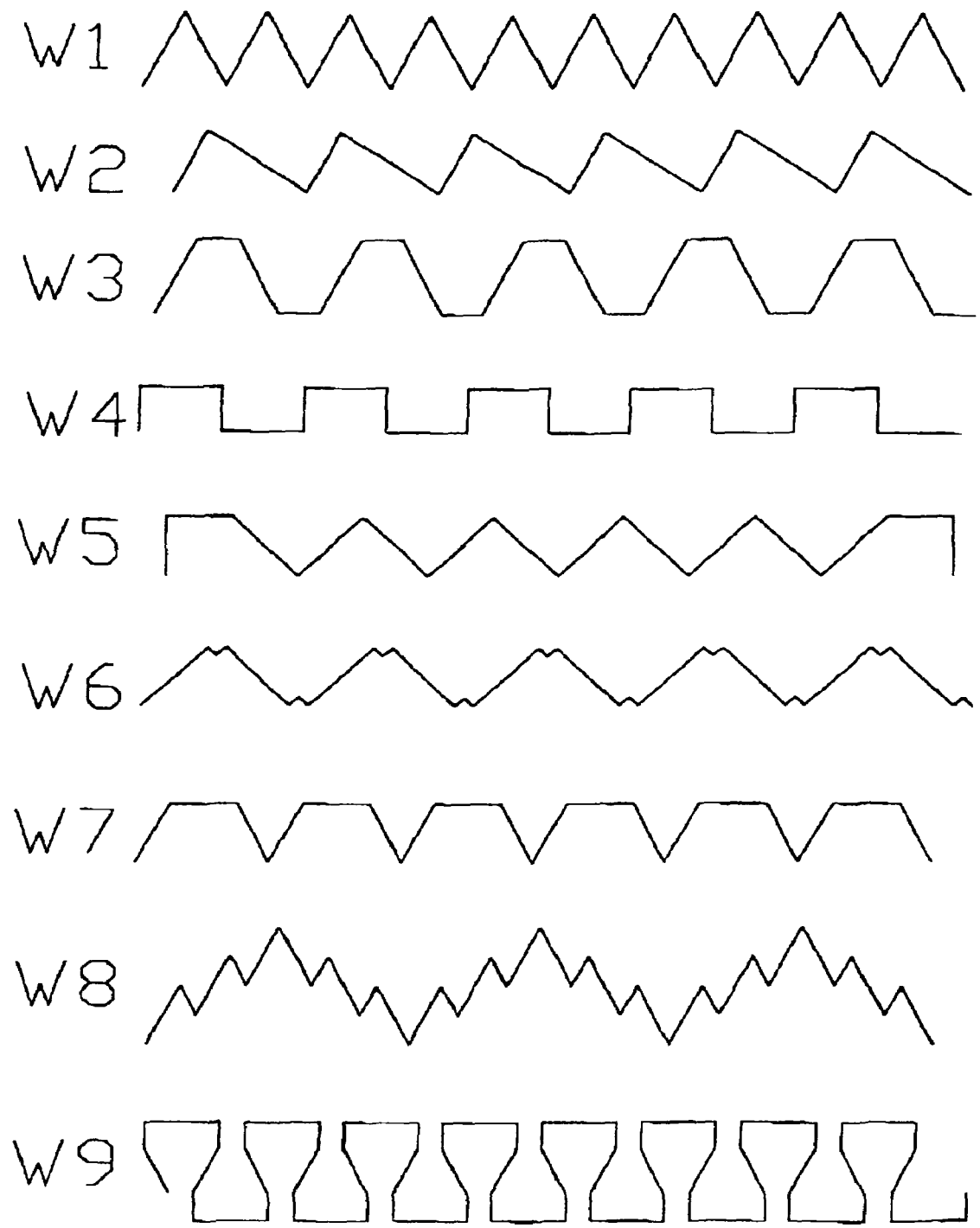
FIG. 28 illustrates a plurality of wave patterns w1-w9 according to the present invention.
Figure 29:
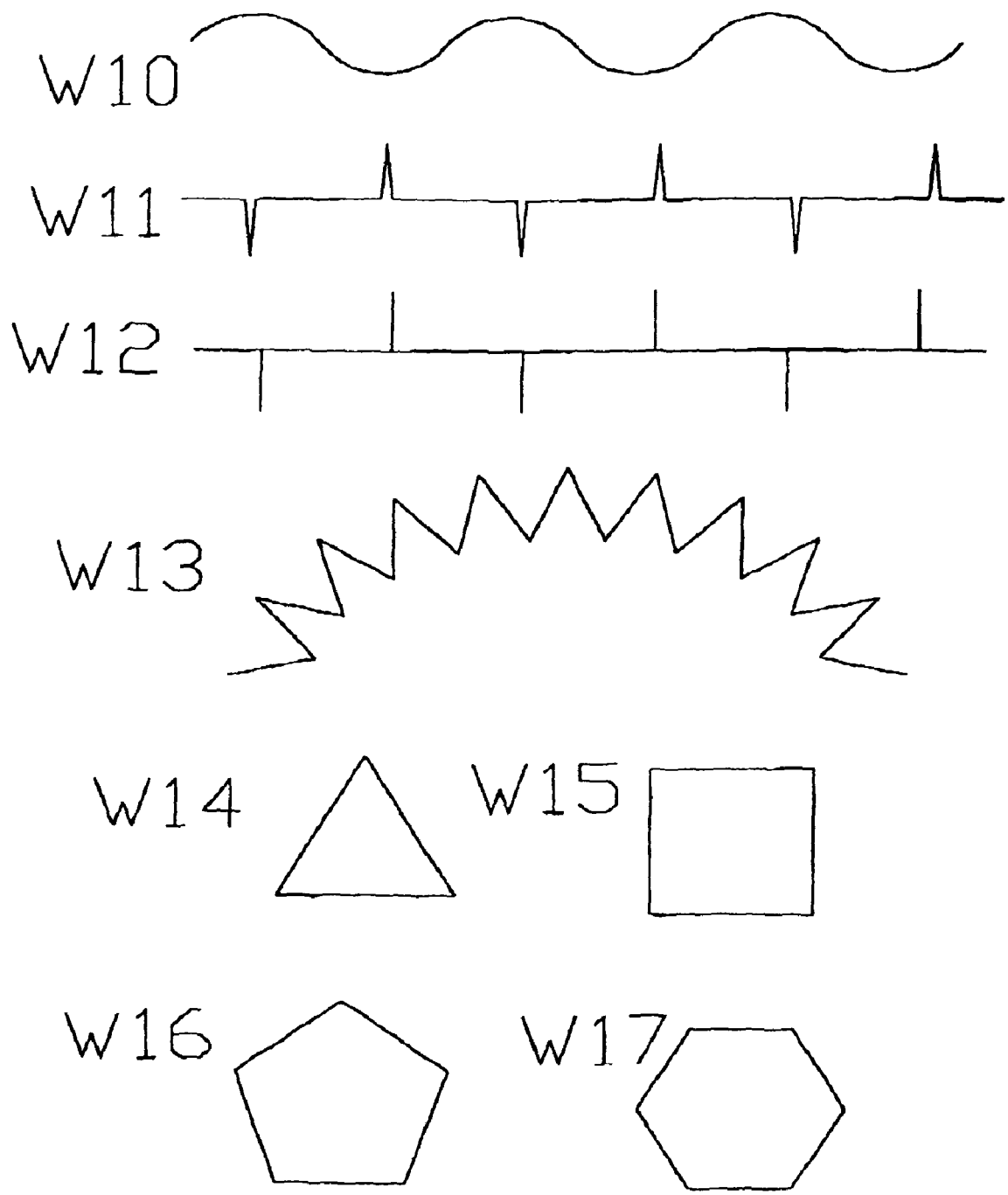
FIG. 29 illustrates another plurality of wave patterns w10-w17 according to the present invention.
Figure 30:
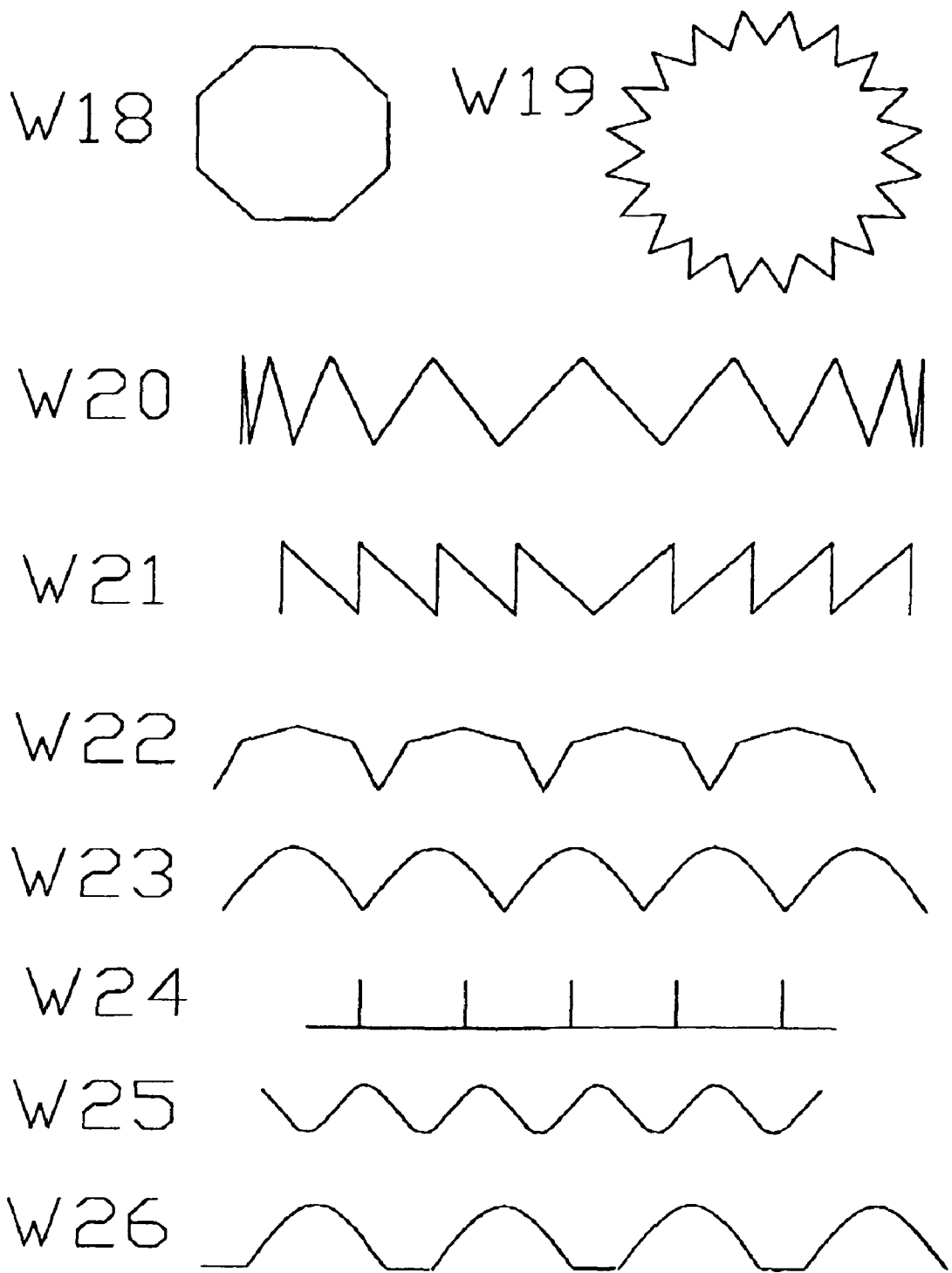
FIG. 30 illustrates yet another plurality of wave patterns w18-w26 according to the present invention.

This procedure for expressing an entire family of folding tessellations in terms of a list of parameters applies to all DPF pattern types by following steps similarly to the example above. One chooses the form of the row and column data most meaningful to the application, expresses the row and column data as parameters, and uses the methodology of this disclosure to generate DPFs of the selected pattern type. FIGS. 28, 29, and 30 show many waves that can be easily reduced to independent parameters. Waves 1-9 and 13-19, 21 and 22 may be used for CCS, Waves 1-8, 10-12 and 20-26 are intended for RCS, or RED, and Waves 1-3, 6-8, 10, 22, 23, 25 and 26 for RET. Section 14 states many ways the waves are used to generate DPFs.

12 Mounting Plate Application and Design

The physical DPFs have many applications, including compartmentalization of space and structural core materials. In these applications and others the DPF often must be attached to external mount points or laminates. It is sometimes useful to design the DPF with convenient locations for contacting the other object. This may provide areas for gluing, welding, riveting, or in general bonding the two together. These areas may be entire facets or partial facets of the DPF, and are called mounting plates. For instance, one application is attaching a DPF truck bed to the truck frame. The mounting plate has many uses including attaching brackets or other objects conveniently, and having flush contact regions for bonding a folded core material to laminated faces. Note the competing honeycomb core material only bonds on its edges to a laminated face, as do prior folded core materials such as FIGS. 4A1 and 4C1.

To incorporate a mounting plate into a DPF parallel to the XY plane, a horizontal segment ((a,f),(b,f)) can be included in the row data, with another horizontal ((c,g),(d,g)) in the CCS data. This will produce a horizontal rectangular facet of width (b-a). In the case that f=0, the height and length of the facet will be g and d-c, respectively. For other f the height and length are adjusted by offset corrections as shown in FIG. 16, where the quantities depend on the choice of row data (RCS, RED, RET), the included angle at (c,g) and (d,g) on CCS, and the sign of $C(-1)^n$, where n is the vertex (c,g) in the CCS vertex list. These quantities can be determined using the DPF Methodology of Part I. In FIG. 5, the procedure is shown for determining offset using RCS row data type. FIG. 4b3 shows an application of this method for designing horizontal mounting plates to bond to parallel faces. In the figure the segments generating the mounting plates occurred periodically in the row and column data, yielding an array of mounting plates.

It is also valuable to use sloped segments in the row and column data to design non-horizontal mounting plates. To design a mounting plate in a given location one may determine the row-cross section and the column-cross section of the desired plate and spline the segments into the RCS and CCS data. Mounting plates are also useful in many multilayer laminations, that use folding tessellations exclusively or combine corrugated surfaces, plane surfaces, or other laminates.

The design and use of mounting areas for materials formed by traditional methods such as stamping and casting is well established. For folded tessellations and other complex folded structures the use of mounting plates has similar utility. Not only is this a new art for folding tessellations, but we present designing techniques for incorporating mounting plates into any of the folded structures in DPF technology.

13 Tie Areas

In application DPFs may be needed to meet specific physical demands, including strength and vibration absorption. For these needs and others it is valuable to incorporate Tie Areas in the folded tessellation structure. These are facet-to-facet bonding areas within a folded structure. Viewing a folded tessellation as an assemblage of individual facets, forming the structure by folding a sheet is already an extremely efficient procedure, for the connectedness of the original sheet inherently provides the facet-to-facet connection across shared edges. Tie areas are additional bonding areas within the DPF that provide locations for gluing, welding, riveting or otherwise bonding the folded tessellation to itself. The manufacturing procedure for bonding the tie areas may occur in parallel or after the forming process, or in certain applications such as producing cylindrical DPFs it may be done in advance.

One technique for producing tie areas is to design the folded tessellation to have edges positioned so their included angle is 0 degrees, that is the edge is completely folded. In this way interior portions of the facets sharing the edge are in flush contact, with this area being ideal for bonding. The technique can be applied across row edges and across column edges in DPFs. Tie areas can also be utilized to bond facets that do not share an edge of the tessellation. In FIG. 28 waves such as W9 can be used as CCS to accomplish this.

Figure 10:
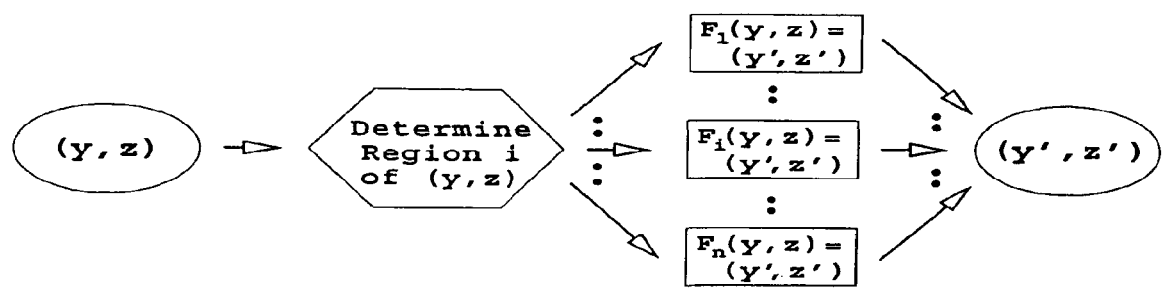
FIG. 10 illustrates the defining of a strip map by polygon correspondence.

To design tie areas to bond adjacent facets sharing a common row edge, one may use RCS or RED row data with a vertical edge. The FIG. 10 shows entire columns of facets, generated with a vertical RCS or RED edge, all successively connected across tie areas. The figure also shows the column under our Uniform DPF Process. A detailed description of this type of tied column is given in Section 16.1.

The Strip-Map Method may also be used to design tie areas by using a strip map devised to fail the injectivity condition on its edges. This can produce tie areas both for facets that share an edge and for those that are not adjacent on the tessellation. Previously, folded core materials had relied on the connectedness of the original sheet for their physical properties. A folded tessellation having a tie area offers an additional possibility of bonding or fastening the folding tessellation to itself. Advantages include stronger core materials.

14 Specific Patterns

This methodology can generate countless DPFs with a wide assortment of applications. FIGS. 28,29,30 show many wave types, which can be readily parameterized as explained in Section 11. For RCS and RED data W1-W8, W10-W12, W20-W26 are useful, and for CCS W1-W9, W13-W19, W21, W22 as well as many not drawn. FIG. 4 shows the array of patterns generated by a few of these waves. Furthermore there are many variations obtained by changing the parameters.

For RCS W4, W5, W12, W20, W21, W24 will produce DPFs with tie areas. In FIGS. 1D and 4B1 the combination RCS:W4 and CCS:W1 is used to produce a core material that becomes exceptionally strong when bonded on the tie areas. A designer may anticipate analytically mixing this core material with the chevron pattern, by trying RCS waves such as W5, W20, W21. These examples may demonstrate a technique for strengthening the sides of a core panel, with W21 showing different flexural properties from above and below. Using RCS:W26 and CCS:W4 or CCS:W3 produces an interesting cushioning material with many mounting plates on one side and round flutes on the other, perhaps for easily installing a cushioning barrier.

For some applications such as packaging materials, a product may be manufactured to a volume reduced state, shipped and stored until purchased by a consumer, whereupon the consumer expands the material to its usable state, and puts it to application. For RCS W1,W6,W8, and CCS W1-W8 the material may manufacture to almost a solid block, to save volume related expenses. For cylindrical materials, CCS W14-W19 offer interesting results. The odd shaped polygons need to be spiraled slightly. This spiraling has value also for even sided CCS, for assembling a long faceted tube from narrow sheet material. Combining CCS:W14-W19 with many RCS waves will produce a core material for interfacing between two cylinder faces. CCS:W13 produces another structural pattern for arches or curved panels.

Part III Forming Process and Material Flow

15 Sheet Process Background

There are many machines and procedures to manufacture the three-dimensional structures produced by our patterning technology. Some include casting, cutting, assembling and stamping. A significant value of DPF structures is that their intrinsic surface geometry corresponds to the intrinsic surface geometry of a sheet. This offers the intended possibility of manipulating a sheet into the DPF geometry without significantly stretching the sheet throughout the forming process. The main obstacle is because none of the folds extend clear across the sheet, all of the fold vertices impose simultaneous constraints forcing the facet motion of the entire sheet to be interlocked. Additionally, the process should be reasonable to implement in machine design.

In origami texts, a process of forming the "chevron" pattern can be found, that folds, unfolds, back-folds, re-folds, etc., a sheet of paper one move at a time until the whole chevron pattern is folded. In this procedure no extraneous creases are made, but many creases are folded and refolded with opposite convexity many times. Another option for a forming process includes allowing temporary folds or bends in the material in the interior of the facet regions that are later removed. In Section 17 another process is disclosed, of allowing a fold to migrate or roll as it is formed until it moves into its final position and then becoming clearly instated. Combining these techniques gives countless potential processes for forming folded structures.

In general one process, described by the three-dimensional flow, can be implemented by many machines. There are many apparatuses to move and direct a material through a cascading network of geometry. However the process, the sequencing and specification of the sheet motions, is essential for assuring the relative distances measured within the material between any two points remain constant, to prevent any stretching of the sheet during the forming of the DPF.

We have developed three processes for producing DPFs without significantly stretching the sheet, and built machines that successfully implement them. To distinguish our procedures from others we have called ours the Uniform DPF Process, the Novel Creasing Process and the Two-Phase Process. The first applies to all DPFs in our main class and to some DPFs outside the main class, but generally will not apply to folding tessellations designed outside our methodology. The second process describes a novel method of producing an individual crease locally. This creasing process is especially useful when faced with the task of efficiently folding complicated networks of folds. The third process solves the tessellation folding problem from a very practical production point of view, and applies to many folded sheet structures inside and outside of our methodology.

16 Uniform DPF Process

16.1 General Information

This section offers a process that solves the 'linkage constraints'. These constraints imply the material is not stretched during the forming process, that no temporary creases, bends or folds occur in the middle of facets during the forming process, and that the folds creases do not migrate. An advantage of this type of forming process is that other forming processes that do not satisfy the linkage constraint essentially change the crease tessellation during the forming process, and in many cases it is desirable to have no temporary folding. The only activity that occurs during the forming processes under the linkage constraints is the folding along the edges of the tessellation and the corresponding rigid motion of the facets. In our solution, the Uniform DPF Process, the fold angles along the creases of a DPF are increased gradually, and simultaneously across the entire tessellation.

Figure 20:
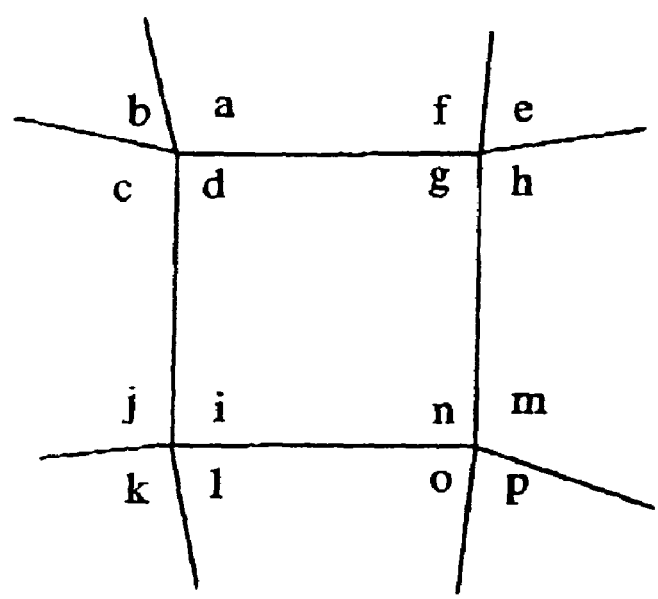
FIG. 20 illustrates that almost all the components cannot fold gradually.

Most of the prior state of the art knowledge on folding tessellations has been done on small paper models. In these models the individual facets do not always remain planar, and generalizations about the folding process are easily made erroneously, and so will not apply to larger tessellations or the tolerances of a machine. One mistake is, if a tessellation has a three-dimensional folded position, to expect it to have a gradual folding process that satisfies the linkage constraints. In FIG. 20, a four-sided polygon is drawn with 16 angles labeled a through p. The polygon may be a square, a rectangle, a parallelogram, a trapezoid, or a general quadrilateral. The angles drawn are not to scale, and the figure is intended only to represent a candidate for a degree-four region, with degree-four vertices, in an arbitrary tessellation. Nearly all (the exceptional set has co-dimension at least 2 and may be closer to 10) of these components will not fold gradually. Unless all of the angles are selected in coordination, similar failure will also occur for triangle, pentagon, and other polygon components with degree four vertices. For instance if a linkage with hinges was constructed to imitate one of these components, forcing the linkage to fold would cause it to bind and bend the leaves of the hinge, or otherwise distort the device. For a generic component correcting the failure would involve changing several of the angles in the figure whose calculation could involve simultaneous quadratic equations involving over 20 variables. Furthermore for a tessellation to fold gradually, not only must every component fold gradually, but all of the components must fold gradually with interlocking equations. The DPFs in the Simple Class have all of their polygons represented by the figure, and will fold gradually under the linkage constraints because of the unusual geometry of our designing algorithms.

DPFs described by row-column methodologies in this disclosure have a distinct advantage over folding tessellations generated by means outside our technology. It has been stated that it is difficult to design folding tessellations without a methodology, for the no-stretch zero-curvature condition imposes a very complicated set of simultaneous conditions on the vertices and edge lengths of a proposed structure. Once designed, as explained above, determining a procedure to fold a tessellation can be even more difficult, even if the description of the desired three-dimensional form is precisely known. In fact most often the linkage constraints have no solution. For DPFs in the Main Class defined by our methods, not only does our Uniform DPF Process satisfy the linkage constraints, but we have numerical procedures that give the Uniform DPF Process. The technology enables one to model the material flow inside a machine and to calculate the position of the various apparatus or computer controlled mechanisms that guide the material.

For DPFs in our Main Class the Uniform DPF Process can be specified in terms of any of our designing methods. With our Uniform DPF Process is associated an additional parameter t, called the flex parameter. The input row and column data can be adapted to yield the correct surface at the intermediary stage t of forming. This is only possible because the intermediary surfaces formed from DPFs in the main class by the Uniform DPF Process are also DPFs in the main class. This is another unique utility of using our methodology.

Each of the DPFs in the main class may start as a tessellation in the plane and may be folded, by the Uniform DPF Process, to increasing extent until there is a collision of facets within the structure. Often the collision occurs between two adjacent facets when their common edge is folded to 180 degrees (0 degree included angle). Any earlier case of facet collision would happen between facets in the same column, and can be ruled out by checking the embedding condition in the Strip-Map Method. When the collision occurs between two adjacent facets, there will in fact be an entire column of facets with their bridging edges folded to 180 degrees. Moreover the entire column will lie in a single vertical plane, and the segment of RCS generating the column will be vertical. Moreover during the Uniform DPF Process the angles of inclination or declination of the segments of RCS start at 0 degrees and change monotonically until one of them reaches the vertical position (assuming as before the strip map is injective in the first coordinate). For this reason we have elected to choose for our flex parameter t the parameterization that runs from 0 to 90 degrees and represents the maximum of the absolute values of the angles of inclination of the segments of RCS. In FIG. 17 this would be the maximum of $|\sigma|$ over all edges of RCS. Of course t could be parameterized or re-parameterized in many ways, for example simply composing this parameterization on the left or right with any smooth monotone function, but for definiteness this t is the parameterization used here.

As only the tessellation data RET and CET remain unchanged during the folding process, while RCS, RED, CCS, and CSM change trigonometrically, we will first show our method for specifying the Uniform DPF Process in terms of RET, CET, and t. This is valuable also because in Section 4 a procedure was given for producing tessellations that would produce the Main Class of DPFs, but no method (other then experimentally working the structure) was given for calculating the three-dimensional form.

16.2 Uniform DPF Process from Wave-Tessellation Data

To utilize the advantage of the zero-curvature structure of DPFs, the forming process also should not induce significant in-plane stretching of the material even temporarily. The forming process may fold, bend, and perhaps unfold, unbend the material, but should not produce in-plane distortions beyond the requirements locally in the folds related to the material thickness and fold radius. Of course if the DPF technology is being used as an architectural base to design hybrids in between traditional forming technology and folding technology, the no-stretch condition during the forming process may be relaxed proportionally to the hybrid. In either case it is desirable to have a mathematical description of a folding process that precisely maintains the no-stretching condition, whether applying it to manufacture a structure produced strictly by folding or using it for an architectural base for a hybrid process.

Several methods for calculating the position of a tessellation in three space during the Uniform DPF Process are described in the subsections that follow. Other defining data for a DPF (RCS, RED, CCS, CSM and the three-dimensional image) all change continuously throughout the Uniform DPF Process, but the tessellation and tessellation data remain constant. Thus the Wave-Tessellation Method provides information that is valuable throughout the Uniform DPF Process, while the Two Cross Section Method, the Wave-Fold Method, the Strip Map Method, and the Composition of Local Isometries Method only give a static DPF, unless they are additionally parameterized and supplied with data indexed by a time or the flex parameter.

This first method converts RET and CET to RCS (or RED) and CCS in terms of the flex parameter t and then applies the Two Cross Section Method (respectively the Wave-Fold Method) to generate the three-dimensional folded form. With the background knowledge of the procedures and methodologies in this disclosure, the most direct approach to generate the folded structure for RET and CET at time t is to convert the data to RCS/RED and CCS and apply the appropriate method. As in FIG. 17, let $E_i$ and $\tau_i$ represent the length and angle of inclination of the $i^{th}$ edge of RET. Likewise for the other variables in the figure under RCS, RET, and RED, the subscript will correspond to that depicted in the $i^{th}$ column in the row. The subscript m is first determined so that the $m^{th}$ segment of RET has maximal absolute slope, that is $|\tau_m|=\max(|\tau_i|)$, where i runs over the edges of RET. We will also use $C_m$, $T_m$ and $E_m$. For CET the subscript j will denote the $j^{th}$ vertex and augmented pair $(y_{j,aj})$ as in Section 4.4, where $y_j$ is the spacing on the y-axis between the $(j-1)^{th}$ and $j^{th}$ row wave of the tessellation, and $a_j$ is the amplitude factor for the $j^{th}$ row wave. Once folded to parameter t, the angle $y_j$ will denote one half the included angle of the $j^{th}$ vertex of CCS similarly to that depicted in FIG. 17.

At t=0 RCS is collinear and horizontal with its $i^{th}$ segment of length $C_i$, determined as the x-displacement of the $i^{th}$ segment of RET. At time t the x displacements and column cross section elevation of the $i^{th}$ segment of RET are $D_i$ and $S_i$ respectively. Define Sgn:R→R to be the function that returns −1,0, or 1 according to the sign of the variable. Solve for $$S_m = \sin(t) \cdot C_m \cdot Sgn(T_m)$$

$$D_m = \cos(t) \cdot C_m$$

Put $k=S_m/T_m$. Then at time t for the $i^{th}$ segment of RET:

$$S_i = kT_i$$

$$D_i = \sqrt{(C_i^2 - S_i^2)}$$

Then RCS is constructed recursively by $$(x0,x0)=(0,0)$$

$$(x_i,z_i)=(x_{i-1}+D_i,z_{i-1}+S_i)$$

The method for producing RED is very similar. Put $k=\sqrt{(E_m\{\text{circumflex over }( )\}2-D_m\{\text{circumflex over }( )\}2)/T_m}=U_m/TM$. Then the x and z displacement of the ith segment of RED are Di and Ui respectively:

$$D_i = \sqrt{(C_i^2 - S_i^2)}$$

$$U_i = kT_i$$

The row RED is then constructed recursively by $$(x0,z0)=(0,0)$$

$$(x_i,z_i)=(x_{i-1}+D_i,z_{i-1}+U_i)$$

The method for calculating CCS at flex parameter t is as follows. Recall CET was expressed as pairs $(y_j, a_j)$. Put $k=\tan(\tau_0)/(a_0 \sin(t))$. Then Length of $j^{th}$ segment of CCS=$y_j$ $$\gamma_j = \arctan(ka_j)$$

To assemble CCS an inductive calculation may also be performed using the lengths yj And half included angles .gamma.j in the YZ plane after choosing the position of the first edge.

Alternatively the trigonometric relationships within FIG. 17 can be applied in other orders around the triangles of the figure to arrive at similar calculation for RCS, RED, or CCS. After calculating either RCS or RED and CCS, the Two Cross Section Method or Wave-Fold Method or others generally described in this document may be applied to calculate the DPF folded to stage t.

16.3 Uniform DPF Process with Two Cross-Section Method

This section completes the steps for taking a RCS and CCS and the resulting DPF, and according to a new flex parameter, changing them to produce the correct new RCS and CCS and DPF.

By using our Two-Cross Section Method, we have described the process of using our RCS and CCS data to design a DPF. Next we describe our technique for describing the Uniform DPF forming process in terms of RCS and CCS. Based on the original RCS and CCS data, this technique will produce the new RCS and CCS data corresponding to any flex parameter $0 \leq t \leq 90$. From this the Two Cross-Section Method may be applied to generate the DPF at state t. Schematically, $$t \to (RCS_t, CCS_t) \to DPF_t$$

From the original RCS $((x_0,z_0), \ldots (x_n,z_n))$ one readily converts back and forth between the incremental form $((x_0, z_0), (D_1,S_1), (D_2,S_2)) \ldots (D_n,S_n))$ where D and S are as in FIG. 17 and $$x_k - x_{k-1} = D_k$$

$$z_k - z_{k-1} = S_k$$

One could alternatively use incremental polar coordinates $(c_k, \sigma_k)$ as in the figure. In either case for simplicity assume $z_0=0$.

Select a maximally sloped edge m to give the current flex parameter, $$\sigma_m = \max \arctan(S_k/D_k)$$

Then, for any flex parameter value t, $0 \leq t \leq 90$, compute the new incremental RCS at stage t in incremental rectangular coordinates by $$S_k' = S_k * \sin(t)/\sin(\sigma_m)$$

$$D_k' = \sqrt{(S_k^2 + D_k^2 - S_{k'}^2)}$$

Or in polar coordinates by $$C_k' = C_k$$

$$\sigma_k' = \arcsin(\sin(t)/\sin(\sigma_m)*\sin(\sigma_k))$$

In either procedure the quantity $bt = \sin(t)/\sin(\sigma_m)$ does not depend on k and could be substituted in advance into the calculations. Once RCS is determined it is then converted back from incremental coordinates to the new $((x_0', z_0'), \ldots (x_n', z_n'))$. The procedure for adapting the original CCS to the new CCS at stage t is similar. Convert CCS $((y_0, z_0), \ldots (y_N, z_N))$ to incremental polar coordinates $(L_k, \theta_k)$ so $$L_k * \sin(\theta_k) = z_{k+1} - z_k$$

$$L_k * \cos(\theta_k) = y_{k+1} - y_k$$

Then $$\gamma_k = (180 + \theta_k - \theta_{k-1})/2$$

$$L_k' = L_k$$

$$\gamma_k' = \tan(\gamma_k) * \sin(\sigma_m)/\sin(t)$$

Then with $\theta_k' = 2\gamma_k' + \theta_{k-1}' - 180$, one converts CCS from its incremental polar form to $((y_0', z_0'), \ldots (y_N', z_N'))$, using the relationship expressed above. This procedure for calculating RCS and CCS at flex parameter t can trivially be varied using the relationships in FIG. 17. Another very similar technique that we have explained converts RCS and CCS into RET and CET as explained in Section 9, applies the Uniform DPF Process with the Wave-Tessellation Data (16.2) to get the DPF at stage t. RCS and CCS can then be read off the DPF if needed for application.

16.4 Uniform DPF Process with Other Methods

The Wave-Fold Method and Strip-Map Method can also be used to study the Uniform DPF Process. The procedure is similar to Section 16.3. The row and column data are entered in advance. The flex parameter t is entered. The row and column data are converted to correspond to the DPF at stage t. The DPF at stage t is then generated from the row and column data. There are many other alternatives due to the relationships in the triangles of FIG. 17, including converting the data to apply to Section 16.2 or 16.3.

17 Novel Crease Forming Process

Surprisingly, there are still new methods for forming individual creases in sheet material. Our novel crease forming process is useful in situations where the material or forming apparatus pose geometrical constraints on the material flow. In particular for folding complicated networks of folds, our new method for forming individual creases is of great value in that it allows for unusual combinations of folds to occur simultaneously.

17.1 Traditional Fold Formation

Figure 21:
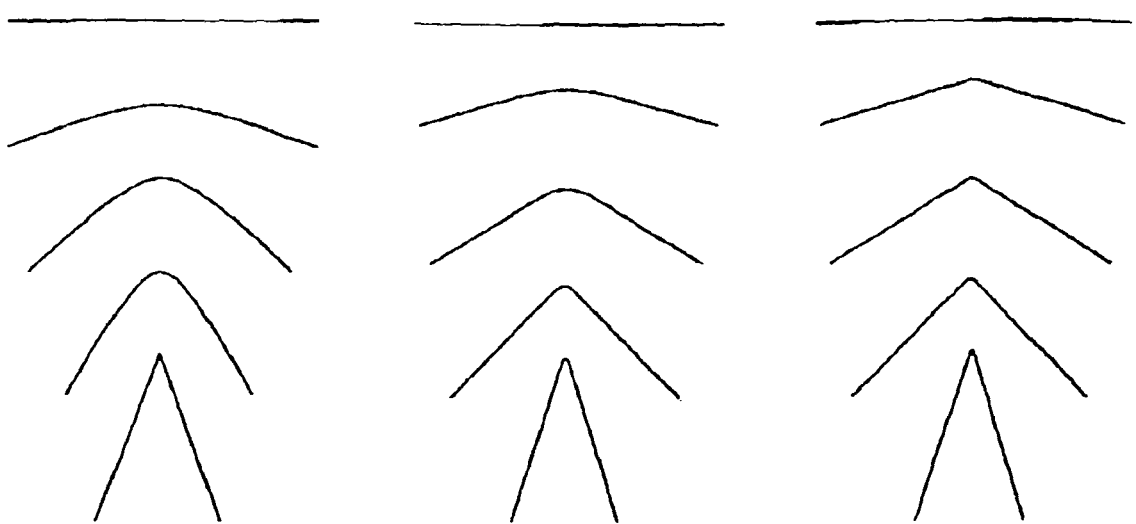
FIG. 21 illustrates the conventional prior art creasing process.

Naturally, to form a crease one may etch, or mark the crease location and then carefully fold it. In brakes and other folding machines one positions the sheet properly and then folds it on the creasing axis of the machine. For continuous process the sheet passes through rollers that instate the crease at the desired location. In each case the folding operation is centered near the location of the final crease. FIG. 21 schematically depicts three variations showing the location of the fold as it is formed. Whether the material is bent softly and then the radius decreased until the crease is formed or whether the radius is small and the fold angle increased, the folding is centered near its final position. In the figure each drawing represents a cross-section of the sheet material as the crease is formed. In the first series the curves are polynomial, the second series the segments are filleted with progressively smaller radii, and the third series is simply an angle becoming more acute. Of course many other curve profiles centered at the final crease location are used by traditional folding processes. The figure both represents a cross-section of the sheet drawn through and edge crease location and through a vertex crease location.

17.2 Fold Migration

Migrating folds are almost common. In the home, a wrinkled piece of aluminum foil may be smoothed by dragging the sheet across the edge of a sharp countertop. The countertop edge produces a crease that travels across the sheet. In the garage, on a belt sander the curved portion of the belt is constantly traveling across the belt surface. Viewed relative to the belt, the curved portion rolls across the material. The two examples are similar, although the countertop edge produces a very small fold radius in comparison to the radius of the drum of the sander.

17.3 Novel Crease Forming Process

Our process, called the Novel Crease forming Process, applies both to edge creases and vertex creases. In common situations it first appears cumbersome, or even absurd, and this non-obviousness had previously inhibited its invention. However this procedure has great utility when forming creases in constrained environments, or under unusual circumstances. Our process combines the two processes above. By usual standards our process starts by 'mis-folding' the sheet and then rolling the bend or crease into final location. The material is softly curved or temporarily creased in a position not directly centered on its final location. The curve or crease is then caused to migrate until it reaches its desired final location. While it is migrating, typically the fold radius and or included fold angle are tightened in preparation of instating the crease at its final location. In some cases the migrating crease will leave a mark in the material, but this can be removed by secondary operation later if necessary.

Figure 22:
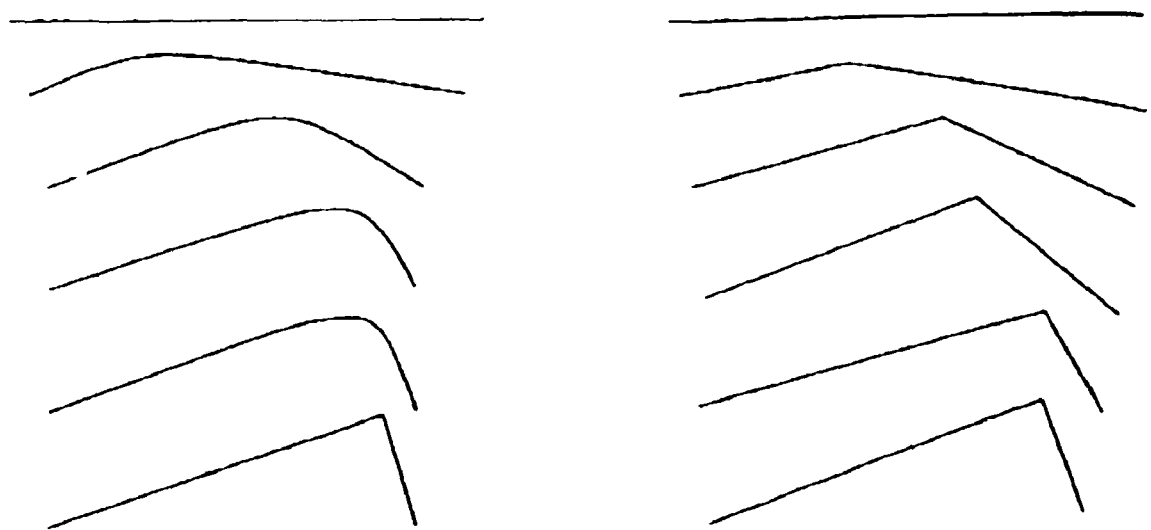
FIG. 22 illustrates the novel creasing process according to the present invention.

FIG. 22 shows two variations on our Novel Creasing Process. In the first series a soft fold migrates and tightens until it reaches the final location on the sheet, and the second series shows a sharp fold migrating and tightening. In the first five cross sections of the second series both the fold location and the fold angle change; in the last cross section only the fold angle was changed.

One advantage of this for manufacturing networks of folds is that it allows for the sheet geometry to be 'roughed out' first under much more lax constraints and with more diverse geometrical tolerances. In particular, the migrating crease locations allow for the tessellation to vary during the forming process. For continuous processes, our novel creasing process may have the creases migrating into the oncoming sheet material as they are formed, and greatly reduces the complexity required of the forming machine.

An application and advantage of our Novel Creasing Process is shown in FIG. 23. In the geometrical environment shown, traditional folding process can produce creases only near the ends of the material, while our process has much greater flexibility.

18 Two-Phase Process

18.1 Utility

Our Two-Phase Process solves two problems. Forming fold tessellations without significantly stretching the material during forming is challenging. The difficulty of working the material locally on the folds, while the overall size of the material contracts in both the x and y directions simultaneously, poses obvious tooling complication and expense. Moreover for continuous processes, since one end of the sheet is folded and the other end is not, some other method not obligated to satisfy the linkage constraints should be employed.

18.2 Continuous Machine Implementation

Figure 24:
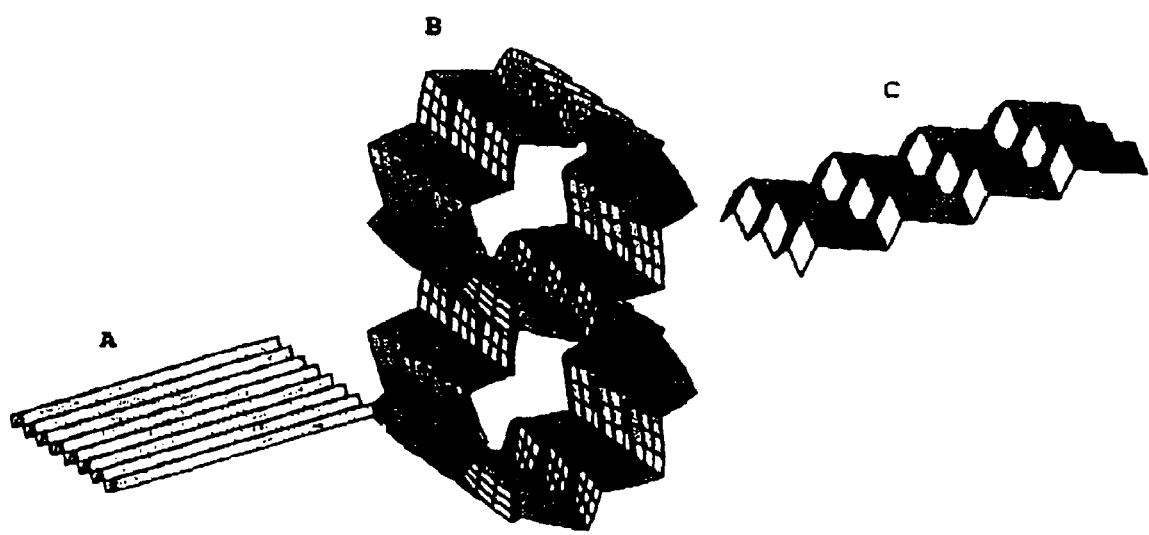
FIG. 24 illustrates the implementation of a two phase forming process using rollers to fold.

In FIG. 24, a schematic of our continuous machine is shown with the material initially pre-gathered into corrugation at A), the DPF forming rollers at B), and the finished DPF at C). The axis of the roller is parallel to the y-axis of the DPF, and the flutes and the direction of the material flow are parallel to the x-axis. In this machine the material is taken from a roll and first pre-gathered into a sine-wave corrugation. The contraction ratio, that is the ratio of the width (the y distance) of the material projected onto the AY plane to the width of the material if measured when unfolded is the same for the material at A) and at C). This notion of pre-gathering the material to have the same contraction ratio as the final DPF is essential to prevent the material from having to contract inside the roller in the direction of the roller axis. For wide rollers this would require the material to slide in the y-direction over the teeth while inside the rollers, which is almost impossible. But contraction in the x direction within the rollers occurs naturally because the forming region on the material is advanced in the x direction, and the teeth revolve to engage in the x-direction. The projected image of the material more rapidly enters into the rollers than it exits.

The strategy of this material flow process was to simplify the simultaneous two-directional contraction of the Uniform DPF Process into independent x and y contractions. In the first phase, the y-pre-gathering into a corrugation type material is easy to perform with a series of guides or rollers; and in the second phase, the remaining x-contraction and fold crease formation is performed easily by advancing the material through a simple roller mechanism. The machine has been tested successfully on paper, copper, and aluminum. As the DPF is produced without stretching the material, this is also a novel use of rollers to fold sheet material.

In the descriptions above one may also use our Continuous Machine Implementation with the roles of x and y interchanged

18.3 Batch Machine and Process

Figure 31:
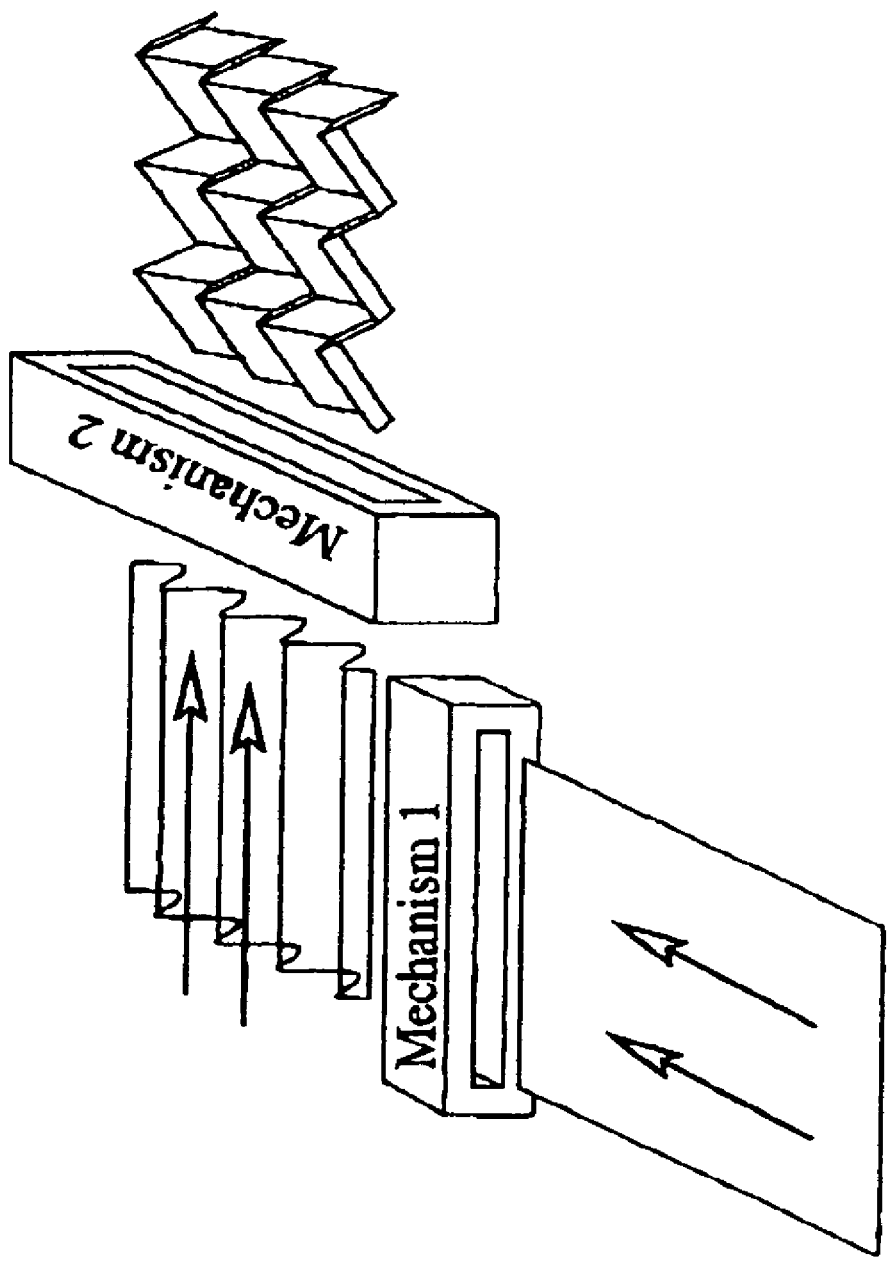
FIG. 31 illustrates a machine implementing a process according to the present invention.

A batch process may proceed as the continuous process above using shorter rectangular sheets. In some cases for rectangular sheets it may be preferable to advance the rectangles along one axis first and then along the other axis second. In this way both phases may induce the contraction in the direction the material is advancing. This contrasts the continuous process above, where since the material is continuously moving in the x-direction, the initial y-contraction occurred orthogonal to the material flow. For machine implementation, a rectangular sheet may be passed first through a mechanism in the y direction, and then through another mechanism in the x direction, as shown in FIG. 31. The first pass imparts a corrugation to the sheet with flutes running parallel to the x-axis. The first mechanism in simple cases could be a pair of corrugated rollers. Since the first phase only requires the overall size of the sheet (the projected image onto the XY plane) to contract in the y direction, and the material is advancing in the y direction, the contraction can take place in the forming region in the corrugated rollers. The produced corrugation is desired, however, to have y-contraction ratio the same as the completed DPF. The profile of the corrugated surface produced should be selected to facilitate the second phase.

Next the fluted material is fed in the x-direction into the second mechanism. Options include having sharply creased or softly bent flutes, and having the y-period of the corrugation greater than, equal to, or less than the y-period of the DPF, and the overall profile of the corrugation. Next the fluted material is advanced in the x-direction relative to the folding mechanism. The material may be fed into the mechanism, or the mechanism may be passed across the material. This could be many devices, including mating patterned rollers, designed by interpolating the folded structures geometry into polar coordinates, as explained in Section 8.5, and computer controlled articulating mechanisms. Two features of the second phase is the no significant stretching of the sheet material and its conversion from a fluted corrugation type geometry to the patterned folded structure. Remarkably, this operation has been carried out successfully on paper and metal foils.

In the descriptions above one may also use our Batch Process with the roles of x and y interchanged.

18.4 Description of Two Phase Process

The Two-Phase Process gives a procedure for producing facet folded structures that is valuable for production. The usual complications of folding the individual edges of a tessellation or fold network, due to the interlocking effect of the fold vertices, resulting in the simultaneous rotation and motion of facets, and the overall contraction of the network in both the x and y directions, had previously been the obstacle to mass-production. This new process reduces the material flow problem to two phases, each of which may readily be carried out by a variety of mechanisms. This valuable simplification of the geometry of the material flow is possible in part through the non-obvious dropping of the linkage constraints and the non-obvious feasibility of phase 2 of the process.

In the first phase the material is pre-gathered in the y-direction, by imparting flutes or corrugations of various profiles. The contraction ratio in the y-direction should be nearly the same for the pre-gathered material and the folded structure, and should be distributed evenly enough to facilitate phase 2. In many cases the creases or bends of the profile will be removed in phase 2, and optionally are not required to be centered on the vertices of the folded structure.

In phase 2 the material is advanced continuously in the x-direction relative to the contact area of the forming mechanism of phase 2. This may be pairs of mating rollers, articulating guides, or other forming tools. The contact tool continuously advances in the x direction across the material, transforming the flutes of the pre-gathered material into defined networks of folds. The material moves locally in the y direction, but the overall contraction ratio in the y-direction of the material before and after phase 2 does not change significantly. The forming process does not significantly stretch the material.

In the descriptions above one may also use our Two-Phase Process with the roles of x and y interchanged.

18.5 Folding Rollers

The use of rollers to form patterned structures by embossing, stamping, or crushing sheet materials is well established. The use of rollers to fold sheet material into DPFs and other folded networks is new. It is surprising that a pre-gathered sheet material, such as a sine-wave corrugation, may be manipulated in three-space under the influence of rollers into a folded tessellation structure. The fact that fluted material will convert into faceted material under a folding operation that does not significantly stretch the material inside rollers is completely non-obvious, and extremely valuable for mass production.

With the methodology for generating DPF vertex coordinates, DPF forming rollers can also be readily designed by interpolating the slab parallel to the XY plane containing the DPF onto a shell of a cylinder. For two such rollers to fully engage, it is sometimes necessary to expand the valleys while preserving the ridges of the patterned rollers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A folded material formed from a sheet product, wherein:
   the folded material has an array of facets with neighboring facets in the array connected across fold crease edges, where the fold crease edges form a net on the folded material, and where the facet and fold crease edges in the folded material corresponds to a facet and fold crease pattern in an unfolded sheet pattern, edges in the unfolded sheet pattern forming a net of fold edges corresponding to the fold crease edges,
   wherein the net of fold edges comprises:
   a plurality of row edge chains, each row edge chain being a chain of fold edges connected along a row direction, each being of one fold convexity in the folded material; and
   a plurality of column edge chains, each column edge chain being a chain of fold edges connected along a column direction and of mixed fold convexity;
   wherein the plurality of row edge chains and the plurality of column edge chains satisfy at least one of conditions (A), (B), (C) or (D) below:
   A) each row edge chain comprises vertices and edge vectors that are an incremental difference between successive vertices that satisfy at least one of
      i) at least four edge vectors are different;
      ii) at least three of the lengths of the edge vectors are different; and
      iii) at least two unsigned included angles at the vertices of the row edge chain are different;
   B) each row edge chain comprises vertices and row edge vectors that are an incremental difference between successive row vertices such that at least three of the row edge vectors are different, and each column edge chain comprises vertices and column edge vectors that are an incremental difference between successive column vertices that satisfy at least one of:
      i) at least two unsigned included angles at the vertices of the column edge chain are different;
      ii) at least two of the lengths of the column edge vectors are different; and
      iii) at least three of the column edge vectors are different and the side of the vertex that has the angle that is less than 180 degrees varies at least once along the column edge chain;
   C) each column edge chain comprises vertices and edge vectors that are an incremental difference between successive vertices that satisfy at least one of:
      i) the column edge chain comprises at least 18 vertices and three of the edge vectors are different;
      ii) at least four of the edge vectors have different lengths; and
      iii) at least three of the unsigned included angles at the vertices are different; and
   D) each column edge chain comprises a quadrilateral and each row edge chain comprises vertices and row edge vectors that are an incremental difference between successive row vertices such that at least three row edge vectors are different.

2. The folded material as claimed in claim 1 wherein the plurality of row edge chains and the plurality of column edge chains satisfy only condition (A).

3. The folded material as claimed in claim 1 wherein the plurality of row edge chains and the plurality of column edge chains satisfy only condition (B).

4. The folded material as claimed in claim 1 wherein the plurality of row edge chains and the plurality of column edge chains satisfy only condition (C).

5. The folded material as claimed in claim 1 wherein the plurality of row edge chains and the plurality of column edge chains satisfy only condition (D).

6. The folded material as claimed in claim 1 wherein the net of fold edges consists of the plurality of row edge chains and the plurality of column edge chains.

7. The folded material as claimed in claim 6 wherein the plurality of row edge chains and the plurality of column edge chains satisfy only condition (A).

8. The folded material as claimed in claim 6 wherein the plurality of row edge chains and the plurality of column edge chains satisfy only condition (B).

9. The folded material as claimed in claim 6 wherein the plurality of row edge chains and the plurality of column edge chains satisfy only condition (C).

10. The folded material as claimed in claim 6 wherein the plurality of row edge chains and the plurality of column edge chains satisfy only condition (D).

11. A patterned material formed from a sheet product, wherein:
    the patterned material comprises a sheet of material, patterning facets formed in the sheet of material by folding without cutting or significantly stretching of the sheet of material, where said sheet of material extends across the patterning facets in both a row direction and a column direction, and where the patterned material is at least partially subdivided by a net of vertices connected by curves and segments, with curves and segments being distinguished as row or column edges, where the row edges are segments or curves and link together in end-to-end row edge chains that extend along the row direction, each row edge chain being along folds of one convexity, and where the column edges are segments and link together in end-to-end column edge chains that extend along the column direction along fold creases or rulings on curved surface areas, where each column edge chain lies on fold creases or surfaces of mixed convexity, wherein each row edge chain and each column edge chain satisfies at least one of conditions (A) and B) below:

A) each row edge chain comprises at least one curve and each column edge chain satisfies at least one of:
   i) having at least 9 vertices and at least three edge vectors that are different;
   ii) having at least 7 vertices and at least two edge vectors that have different lengths; and
   iii) at least two of the unsigned included angles at the vertices are distinct; and
B) each row edge chain comprises curves and segments or curves and cusps and has at least three vertices.

12. The patterned material as claimed in claim 11 wherein each row edge chain and each column edge chain satisfies only condition (A).

13. The patterned material as claimed in claim 11 wherein each row edge chain and each column edge chain satisfies only condition (B).

14. The patterned material as claimed in claim 11 wherein the patterned material is entirely subdivided by the net of vertices.

15. A patterned material formed from a sheet product, wherein:

the patterned material comprises a sheet of material, patterning facets formed in the sheet of material by folding without cutting or significantly stretching of the sheet of material, where said sheet of material extends across the patterning facets in both a row direction and a column direction, and where the patterned material is at least partially subdivided by a net of vertices connected by curves or segments, with curves and segments being distinguished as row or column edges, where the row edges are segments or curves and link together in end-to-end row edge chains that extend along the row direction, each row edge chain along folds of one convexity, and where the column edges are segments and link together in end-to-end column edge chains that extend along the column direction along fold creases or rulings on curved surface areas, where each column edge chain lies on fold creases or surfaces of mixed convexity, wherein each column edge chain comprises vertices and edge vectors that are the incremental difference between successive vertices, and a multiplicity of row edge chains have segments perpendicular to the row direction and said perpendicular row edges lie on a completely folded fold-crease of the patterned sheet and induce contact areas between the neighboring facets in the folded sheet material, and wherein adhesive, bonding agent or a fastening method is applied at said contact areas to tie or bond neighboring facets together.

16. A patterned material formed from a sheet product, wherein:

the patterned material comprises a sheet of material, patterning facets formed in the sheet of material by folding without cutting or significantly stretching of the material, where said sheet of material extends across the patterning facets in both a row direction and a column direction, and where the patterned material is at least partially subdivided by a net of vertices connected by curves or segments, with curves and segments being distinguished as row or column edges, where the row edges are segments or curves and link together in end-to-end row edge chains that extend along the row direction, each row edge chain along folds of one convexity, and where the column edges are segments and link together in end-to-end column edge chains that extend along the column direction along fold creases or rulings on curved surface areas, where each column edge chain lies on fold creases or surfaces of mixed convexity, wherein at least one of conditions (A), (B) or (C) is true:

A) each column edge chain comprises vertices and edge vectors that are the incremental difference between successive vertices has edge vectors of two different lengths and an adhesive, bonding agent or fastening method is applied on a plurality of row edge chains to attach another sheet material product;
B) a repetition of facets corresponding to repetitions of segments in the row edge chain and repetitions of segments in the column edge chain are used for bonding sites for another sheet product; and
C) at least one segment in a column edge chain and one segment in a row edge chain correspond to a facet on the patterned surface that is used for bonding another sheet material or product.

17. The patterned material as claimed in claim 16 wherein only condition (A) is satisfied.

18. The patterned material as claimed in claim 16 wherein only condition (B) is satisfied.

19. The patterned material as claimed in claim 16 wherein only condition (C) is satisfied.

20. The patterned material as claimed in claim 16 wherein the patterned material is entirely subdivided by the net of vertices.

* * * * *